(12) United States Patent
Hayama et al.

(10) Patent No.: US 12,146,574 B2
(45) Date of Patent: Nov. 19, 2024

(54) FLOW RATE CONTROL VALVE

(71) Applicant: EAGLE INDUSTRY CO., LTD., Tokyo (JP)

(72) Inventors: Masahiro Hayama, Tokyo (JP); Toshinori Kanzaki, Tokyo (JP); Keichi Urushiyama, Tokyo (JP); Kohei Fukudome, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/017,825

(22) PCT Filed: Jul. 27, 2021

(86) PCT No.: PCT/JP2021/027766
§ 371 (c)(1),
(2) Date: Jan. 24, 2023

(87) PCT Pub. No.: WO2022/030311
PCT Pub. Date: Feb. 10, 2022

(65) Prior Publication Data
US 2023/0272859 A1 Aug. 31, 2023

(30) Foreign Application Priority Data
Aug. 4, 2020 (JP) .................. 2020-132384

(51) Int. Cl.
*F16K 1/36* (2006.01)
*F16K 1/38* (2006.01)
(Continued)

(52) U.S. Cl.
CPC .................. *F16K 1/36* (2013.01); *F16K 1/38* (2013.01); *F16K 1/385* (2013.01); *F16K 1/54* (2013.01); *B60H 2001/3275* (2013.01)

(58) Field of Classification Search
CPC ... F16K 1/36; F16K 1/385; F16K 1/38; F16K 1/54; F16K 31/0655; F16K 27/029;
(Continued)

(56) References Cited

U.S. PATENT DOCUMENTS

| 813,555 A | 2/1906 | Hayden | F16K 1/34 |
| 821,758 A | 5/1906 | Smith | F16K 1/46 |

(Continued)

FOREIGN PATENT DOCUMENTS

| CN | 107339442 | 11/2017 | F16K 1/02 |
| EP | 0229315 | 7/1987 | F02M 3/07 |

(Continued)

OTHER PUBLICATIONS

U.S. Appl. No. 18/019,057, filed Jan. 31, 2023, Fukudome et al.

(Continued)

*Primary Examiner* — John Bastianelli
(74) *Attorney, Agent, or Firm* — HAYES SOLOWAY P.C.

(57) ABSTRACT

A valve in which a small driving force of a drive source is required when the valve is closed. A valve includes a valve housing and a valve body to be driven by a drive source, and controls a flow rate of a fluid flowing through a through-flow passage in a direction opposite a closing direction of the valve body, by moving the valve body from a control region to a closing region. The valve body has an effective pressure-receiving area where a pressure of the fluid acts on the valve body. The effective pressure-receiving area is switched between the effective pressure-receiving area in the control region and the effective pressure-receiving area in the closing region. The effective pressure-receiving area is smaller than the effective pressure-receiving area.

15 Claims, 17 Drawing Sheets

(51) Int. Cl.
*F16K 1/54* (2006.01)
*B60H 1/32* (2006.01)

(58) Field of Classification Search
CPC ......... F16K 27/0254; B60H 2001/3275; F04B 2027/1813; F04B 2027/1831; F04B 2027/185; F04B 27/1804; F04B 27/18; F04B 27/1009
USPC .................................................. 251/318, 122
See application file for complete search history.

(56) References Cited

U.S. PATENT DOCUMENTS

| | | | | |
|---|---|---|---|---|
| 877,865 | A | 1/1908 | Ricksecker | F16K 1/34 |
| 1,449,876 | A | 3/1923 | Erastus | F01L 3/20 |
| 1,758,471 | A | 5/1930 | Julius | F16K 1/46 |
| 1,800,127 | A | 4/1931 | Wilson | F16K 1/34 |
| 1,847,385 | A | 3/1932 | Franklin | F16K 1/34 |
| 2,196,798 | A | 4/1940 | Otto | F16K 1/36 |
| 2,887,293 | A * | 5/1959 | Gasche | F16K 31/60 |
| | | | | 251/274 |
| 2,893,685 | A | 7/1959 | Camp | F16K 1/36 |
| 2,898,082 | A | 8/1959 | Von Almen | F04B 52/1207 |
| 3,049,332 | A * | 8/1962 | Webster | F16K 1/02 |
| | | | | 403/33 |
| 3,054,422 | A | 9/1962 | Napolitano | F16K 1/385 |
| 3,070,120 | A | 12/1962 | Wendt | F16K 1/46 |
| 3,185,438 | A | 5/1965 | Smirra | F16K 1/34 |
| 3,204,925 | A * | 9/1965 | Montuori | F16K 1/50 |
| | | | | 251/274 |
| 3,230,973 | A | 1/1966 | Rudolf | F16K 1/46 |
| 3,278,156 | A * | 10/1966 | Callahan, Jr. | F16K 41/10 |
| | | | | 251/335.1 |
| 3,394,732 | A | 7/1968 | Constantine | F16K 1/36 |
| 3,426,741 | A | 2/1969 | Haagen | F01L 3/02 |
| 3,679,169 | A * | 7/1972 | Bedo | F16K 41/02 |
| | | | | 251/88 |
| 3,854,495 | A | 12/1974 | Cowley | G05D 16/0663 |
| 4,149,699 | A * | 4/1979 | Speckmann | F16K 41/00 |
| | | | | 251/223 |
| 4,318,532 | A | 3/1982 | Winkler | F16K 1/34 |
| 4,345,739 | A | 8/1982 | Wheatley | F16K 1/2263 |
| 4,417,601 | A * | 11/1983 | Bennett | A62C 31/12 |
| | | | | 251/215 |
| 4,448,038 | A | 5/1984 | Barbier | F25B 41/34 |
| 4,474,356 | A * | 10/1984 | Baumann | F16K 1/12 |
| | | | | 251/124 |
| 4,617,889 | A | 10/1986 | Nishimiya | F02D 31/00 |
| 4,632,358 | A | 12/1986 | Orth | F25B 41/347 |
| 4,778,150 | A * | 10/1988 | Pratt | F16K 41/043 |
| | | | | 251/274 |
| 4,825,909 | A | 5/1989 | Martin | F15B 13/02 |
| 4,848,729 | A | 7/1989 | Danzy | F16K 1/46 |
| 4,915,355 | A | 4/1990 | Fort | F16K 1/46 |
| 4,922,957 | A | 5/1990 | Johnson | F16K 1/46 |
| 4,923,173 | A | 5/1990 | Szymaszek | F16K 1/36 |
| 5,011,116 | A | 4/1991 | Alberts | F16K 47/00 |
| 5,232,195 | A * | 8/1993 | Torrielli | H01F 7/1607 |
| | | | | 251/129.08 |
| 5,246,205 | A | 9/1993 | Gillingham | F01N 3/0212 |
| 5,364,066 | A * | 11/1994 | Dorste | F25B 41/35 |
| | | | | 251/210 |
| 5,439,027 | A * | 8/1995 | Layton | F16K 1/385 |
| | | | | 137/513.5 |
| 6,155,391 | A | 12/2000 | Kashiwagi et al. | F16F 9/348 |
| 6,315,266 | B1 | 11/2001 | Hirota | F16K 31/406 |
| 6,776,182 | B2 | 8/2004 | Ishitoya | F16K 25/00 |
| 6,811,140 | B1 | 11/2004 | Maini | F16K 1/46 |
| 6,840,504 | B2 | 1/2005 | Hagiwara | F16K 1/36 |
| 6,959,718 | B2 | 11/2005 | Kayahara | F16K 31/0655 |
| 7,007,917 | B2* | 3/2006 | Choi | F16K 31/0655 |
| | | | | 251/129.21 |
| 7,040,595 | B2 | 5/2006 | Hirota | F16K 31/02 |
| 7,481,417 | B2 | 1/2009 | Mayer | F16K 51/02 |
| 7,726,949 | B2 | 6/2010 | Taguchi | F04B 1/26 |
| 7,758,014 | B2* | 7/2010 | Lancaster | F16K 1/04 |
| | | | | 251/903 |
| 7,832,653 | B2* | 11/2010 | Yukimoto | F25B 41/39 |
| | | | | 251/126 |
| 7,971,797 | B2 | 7/2011 | Habermann | F16K 31/002 |
| 8,128,061 | B2 | 3/2012 | Uemura | F04B 27/1804 |
| 8,328,163 | B2 | 12/2012 | Boesch | F16K 1/36 |
| 8,387,947 | B2 | 3/2013 | Uemura | F04B 27/1804 |
| 8,469,337 | B1 | 6/2013 | Hoeptner | F16K 1/36 |
| 8,579,257 | B2 | 11/2013 | Taylor | F16K 1/46 |
| 8,684,037 | B2 | 4/2014 | Huynh | F15B 13/01 |
| 9,243,733 | B2 | 1/2016 | Lively | G05D 16/02 |
| 9,383,021 | B2 | 7/2016 | Kosmehl | F16K 1/36 |
| 9,470,337 | B2 | 10/2016 | Roper | F16K 1/36 |
| 9,638,082 | B2 | 5/2017 | Fujita | F16K 25/00 |
| 10,378,657 | B2 | 8/2019 | Lin | F16K 1/46 |
| 11,092,244 | B1 | 8/2021 | Hu | F16K 1/36 |
| 11,480,166 | B2 | 10/2022 | Hayama et al. | F04B 27/10 |
| 2003/0197141 | A1 | 10/2003 | Kajitani | F16L 47/00 |
| 2005/0163624 | A1 | 7/2005 | Taguchi | F04B 27/1804 |
| 2010/0051838 | A1 | 3/2010 | Uemura | F04B 27/1804 |
| 2010/0282991 | A1 | 11/2010 | Okamoto | F16K 31/02 |
| 2014/0109973 | A1 | 4/2014 | Neumeister | C23C 16/4412 |
| 2015/0004010 | A1 | 1/2015 | Saeki | F04B 27/1804 |
| 2015/0104334 | A1 | 4/2015 | Ota et al. | F04B 27/1804 |
| 2015/0276065 | A1 | 10/2015 | Yoshida | F16K 3/246 |
| 2017/0261113 | A1 | 9/2017 | Sato | F16K 31/0675 |
| 2018/0238455 | A1* | 8/2018 | Yazawa | F16K 31/508 |
| 2020/0088178 | A1 | 3/2020 | Fukudome et al. | F16K 31/06 |
| 2020/0173580 | A1 | 6/2020 | Sandeck | F16K 51/02 |
| 2020/0325881 | A1 | 10/2020 | Hayama et al. | F04B 27/18 |

FOREIGN PATENT DOCUMENTS

| | | | |
|---|---|---|---|
| EP | 2180217 | 4/2010 | F16K 31/06 |
| EP | 3258103 | 12/2017 | F04B 27/18 |
| EP | 3296599 | 3/2018 | F16K 1/34 |
| EP | 3366957 | 8/2018 | F16K 1/34 |
| JP | 5682358 | 7/1981 | G03B 15/00 |
| JP | 5740945 | 8/1982 | B21B 39/14 |
| JP | H04171361 | 6/1992 | F04B 49/00 |
| JP | 5346276 | 12/1993 | F25B 41/96 |
| JP | 626454 | 2/1994 | F04B 27/08 |
| JP | H0711313 | 2/1995 | F16K 1/34 |
| JP | H10220926 | 8/1998 | F25B 41/06 |
| JP | 11287281 | 10/1999 | F16F 9/348 |
| JP | 2001012534 | 1/2001 | F16F 9/46 |
| JP | 2001153495 | 6/2001 | F16K 31/06 |
| JP | 2001153498 | 6/2001 | F16K 31/06 |
| JP | 2003004160 | 1/2003 | F16K 31/04 |
| JP | 2003301772 | 10/2003 | |
| JP | 2003314745 | 11/2003 | F16K 51/02 |
| JP | 2004101163 | 4/2004 | F25B 41/06 |
| JP | 2005351605 | 12/2005 | F16K 1/38 |
| JP | 2006153204 | 6/2006 | F16K 31/04 |
| JP | 2008190574 | 8/2008 | F16K 31/06 |
| JP | 2009030752 | 2/2009 | F16K 31/06 |
| JP | 2009115204 | 5/2009 | F16K 31/04 |
| JP | 2009221965 | 10/2009 | F04B 27/14 |
| JP | 2010019406 | 1/2010 | F16K 31/04 |
| JP | 2011525962 | 9/2011 | F16F 9/32 |
| JP | 4822735 | 11/2011 | A43B 23/24 |
| JP | 2013100915 | 5/2013 | F15K 31/06 |
| JP | 2015075054 | 4/2015 | F04B 27/14 |
| JP | 2017180525 | 10/2017 | F16K 31/04 |
| JP | 2018015739 | 2/2018 | C02F 1/46 |
| JP | 2018035840 | 5/2018 | |
| JP | 2018135954 | 8/2018 | F16K 31/06 |
| JP | 2019138473 | 8/2019 | F16K 1/36 |
| JP | 2019167982 | 10/2019 | F16K 1/38 |
| JP | 2020041606 | 3/2020 | F16K 1/44 |
| WO | WO2009025298 | 2/2009 | F16K 31/06 |
| WO | WO2011132438 | 10/2011 | F16K 31/06 |
| WO | WO2018124156 | 7/2018 | F16K 31/06 |
| WO | WO2020013169 | 1/2020 | F04B 27/18 |

(56) References Cited

OTHER PUBLICATIONS

U.S. Appl. No. 18/019,230, filed Feb. 1, 2023, Fukudome et al.
U.S. Appl. No. 18/019,060, filed Jan. 31, 2023, Kanzaki et al.
U.S. Appl. No. 18/019,066, filed Jan. 31, 2023, Kanzaki et al.
U.S. Appl. No. 18/017,824, filed Jan. 24, 2023, Ejima et al.
U.S. Appl. No. 18/029,063, filed Mar. 28, 2023, Higashidozono et al.
U.S. Appl. No. 18/029,065, filed Mar. 28, 2023, Higashidozono.
Official Action issued in European related Application Serial No. 21853139.0, dated Mar. 22, 2024, 15 pages.
Official Action issued in European related Application Serial No. 21852577.2, dated Mar. 22, 2024, 9 pages.
Official Action issued in European related Application Serial No. 21853892.4, dated Mar. 22, 2024, 8 pages.
Official Action issued in U.S. Appl. No. 18/019,230, dated Apr. 25, 2024, 11 pages.
Official Action issued in U.S. Appl. No. 18/019,066, dated Apr. 24, 2024, 6 pages.
Official Action issued in U.S. Appl. No. 18/029,065, dated Apr. 23, 2024, 14 pages.
Official Action issued in U.S. Appl. No. 18/017,824, dated Mar. 13, 2024, 19 pages.
Official Action issued in U.S. Appl. No. 18/019,060, dated Apr. 26, 2024, 6 pages.
Notice of Allowance issued in U.S. Appl. No. 18/022,465, dated Apr. 25, 2024, 7 pages.

* cited by examiner

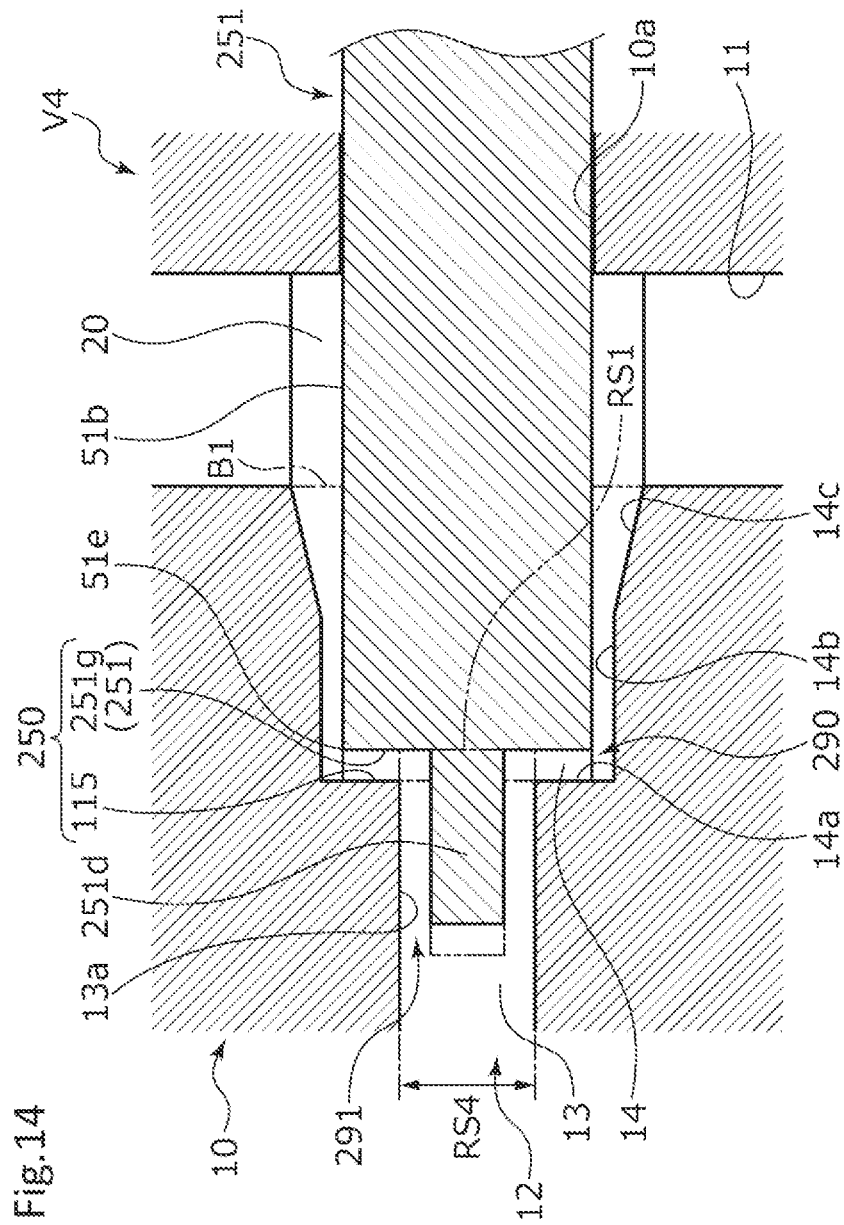

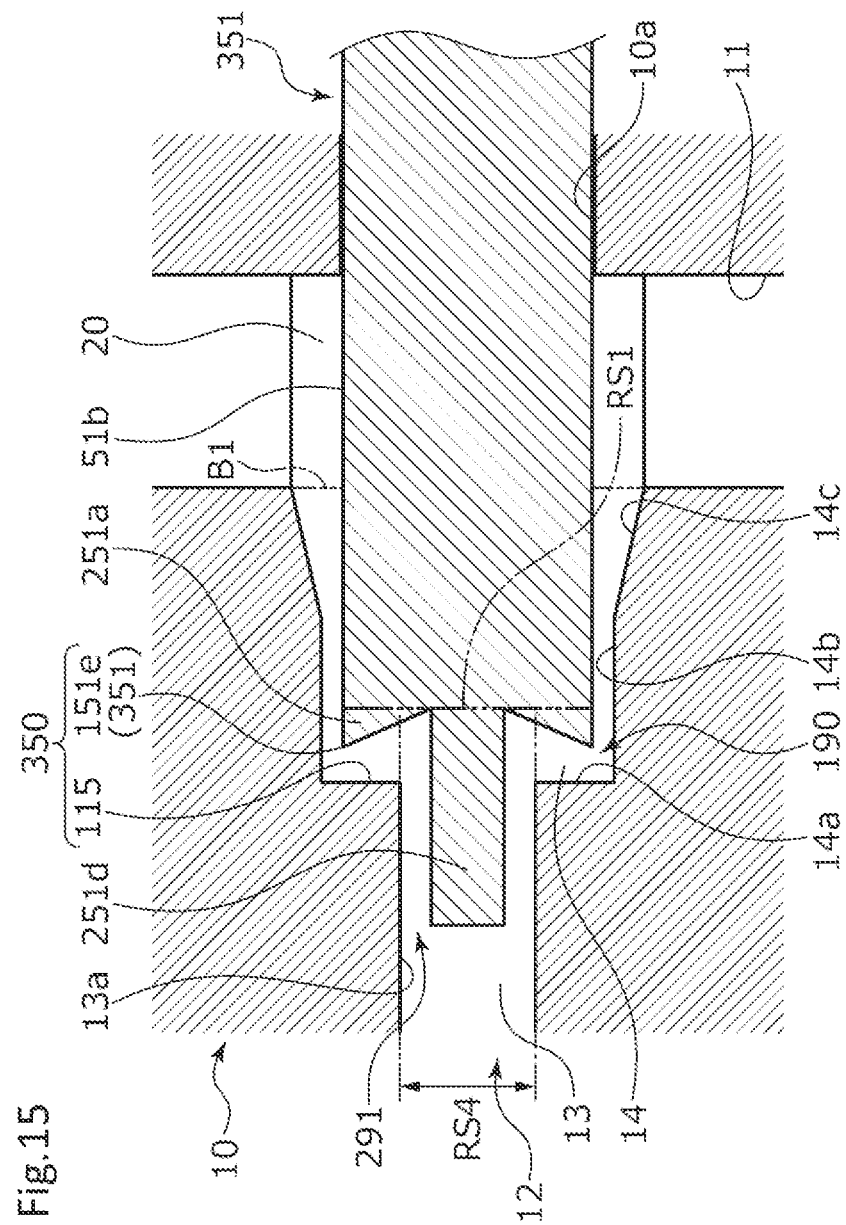

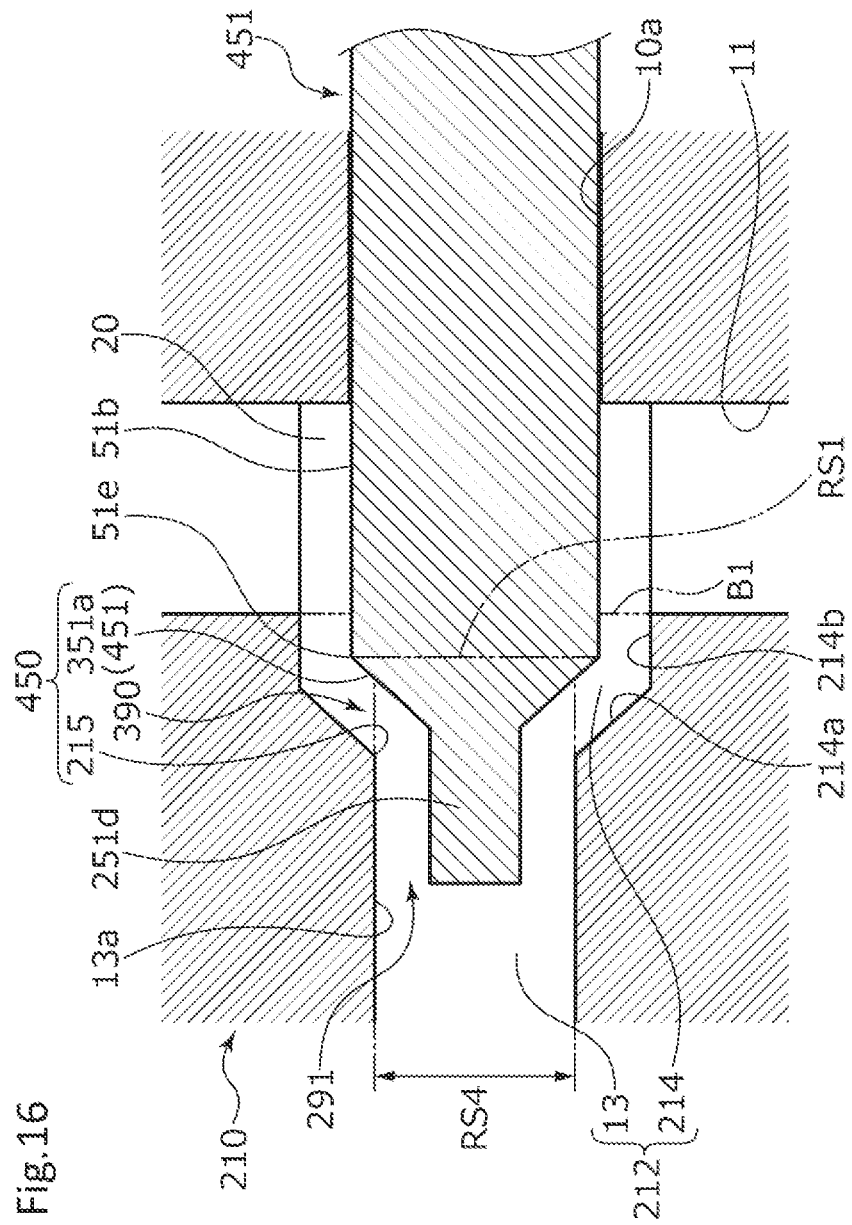

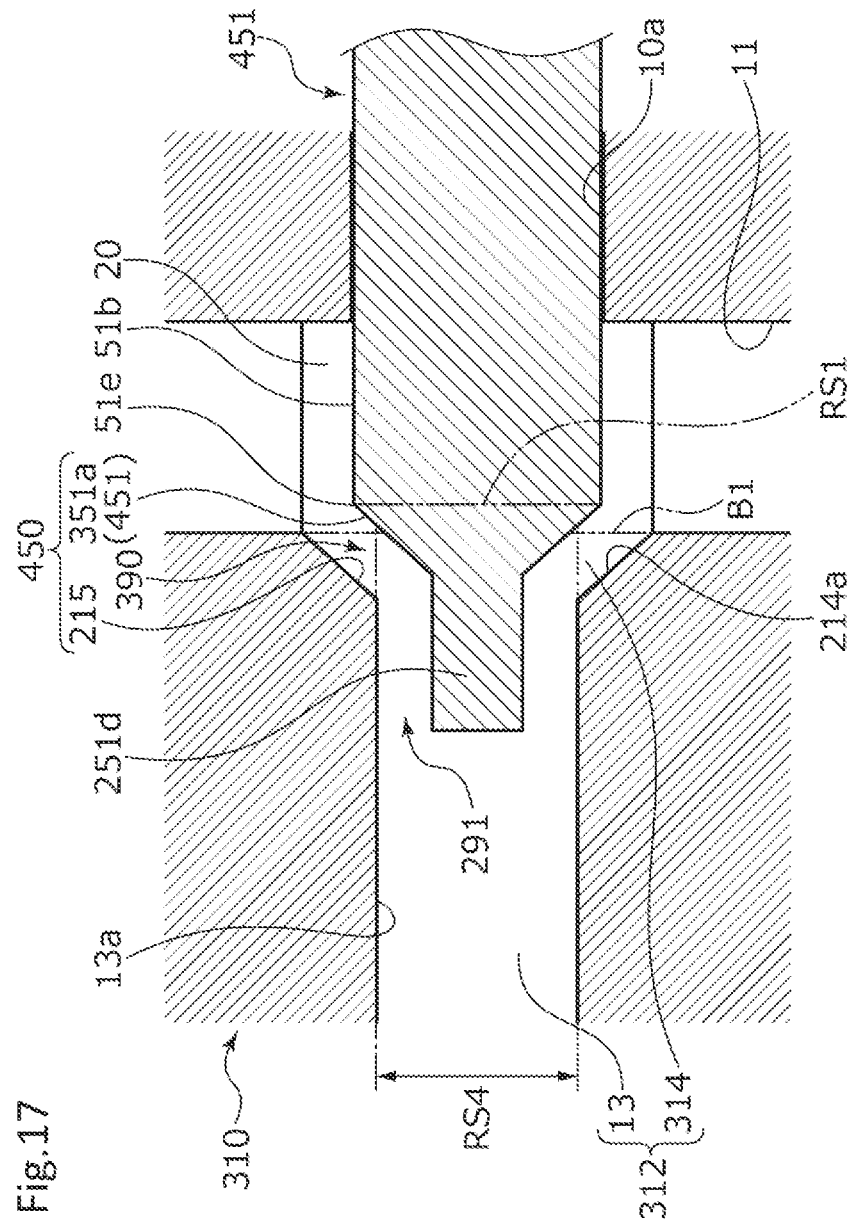

FLOW RATE CONTROL VALVE

TECHNICAL FIELD

The present invention relates to a flow rate control valve that variably controls a working fluid, for example, to a valve that controls a discharge amount of a variable displacement compressor used for an air conditioning system of an automobile according to pressure.

BACKGROUND ART

A variable displacement compressor used for an air conditioning system of an automobile, etc. includes a rotating shaft to be rotationally driven by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve as a valve that is driven to open and close by electromagnetic force of a solenoid as a drive source.

At the time of continuously driving the variable displacement compressor, the capacity control valve performs normal control in which energization is controlled by a control computer, a valve body is moved in an axial direction by electromagnetic force generated in the solenoid, and a flow passage between a discharge port and a control port is opened and closed by a valve to adjust the control pressure Pc of the control chamber of the variable displacement compressor.

For example, in a capacity control valve disclosed in Patent Citation 1, when a valve is in an open state where the solenoid is not energized, the fluid flows to the control port through a through-flow passage communicating with the discharge port in a housing. When the solenoid is energized from the open state, a valve body having a rod shape moves toward a valve seat formed in the through-flow passage, to be able to close the through-flow passage. In such a manner, pressure in the control chamber of the variable displacement compressor is controlled using the fluid of the discharge pressure Pd higher than the control pressure Pc.

In addition, there is a capacity control valve that controls a flow rate of the fluid flowing from the control port to the suction port. Such a capacity control valve controls pressure in the control chamber of the variable displacement compressor using a pressure difference between the control pressure Pc and the suction pressure Ps lower than the control pressure Pc.

CITATION LIST

Patent Literature

Patent Citation 1: JP 2009-221965 A (Pages 8 to 10 and FIG. 2)

SUMMARY OF INVENTION

Technical Problem

In the capacity control valve disclosed in Patent Citation 1, when the valve is closed, the valve body needs to be moved in a direction opposite a direction of the fluid flowing through the through-flow passage, and a force acts on the valve body from the fluid in a direction opposite a driving force of the solenoid. Particularly, in a state where the pressure of the fluid is large, the force that the valve body receives from the fluid is strong, and a large driving force is required for the solenoid to cope with this state.

The present invention is conceived in view of such a problem, and an object of the present invention is to provide a valve in which a small driving force of a drive source is required when the valve is closed.

Solution to Problem

In order to solve the foregoing problem, a valve according to the present invention includes: a valve housing; and a valve body to be driven by a drive source, wherein the valve controls a flow rate of a fluid flowing through a through-flow passage in a direction opposite a closing direction of the valve body, by moving the valve body from a control region to a closing region, the valve body has an effective pressure-receiving area where a pressure of the fluid acts on the valve body, the effective pressure-receiving area being switched, in accordance with a movement of the valve body in the axial direction, between a control regional effective pressure-receiving area that exists when the valve body is positioned in the control region and a closing regional effective pressure-receiving area that exists when the valve body is positioned in the closing region, and the closing regional effective pressure-receiving area is smaller than the control regional effective pressure-receiving area. According to the aforesaid feature of the present invention, since the closing regional effective pressure-receiving area is smaller than the control regional effective pressure-receiving area, and a force that the valve body receives due to the pressure of the fluid is small, the required driving force of the drive source that drives the valve body when the valve is closed can be small.

It may be preferable that the through-flow passage includes a closing portion that adjusts a flow rate of the fluid when the valve body is positioned in the closing region, and a throttle portion that adjusts a flow rate of the fluid when the valve body is positioned in the control region. According to this preferable configuration, the flow rate in the closing region and the flow rate in the control region can be individually adjusted by the closing portion and the throttle portion. For this reason, the closing-reginal effective pressure-receiving area can be small by performing switching between the closing reginal effective pressure-receiving area and the control regional effective pressure-receiving area according to the stroke of the valve body.

It may be preferable that an opening area of the throttle portion is constant when the valve body is positioned in the closing region. According to this preferable configuration, in a state where switching to the closing region is performed, the influence of the fluid passing through the throttle portion on the valve body can be reduced.

It may be preferable that the closing portion has a poppet valve structure. According to this preferable configuration, the sealing property when the valve is closed can be improved.

It may be preferable that the closing portion has a spool valve structure. According to this preferable configuration, since the valve body does not practically come into contact with the through-flow passage, the sealing performance is unlikely to decrease.

It may be preferable that a cross-sectional area of a tip portion is narrower than a cross-sectional area of a base portion in the valve body. According to this preferable configuration, since the cross-sectional area of the tip portion is the closing reginal effective pressure-receiving area, and the cross-sectional area of the base portion is the control regional effective pressure-receiving area, the valve body has a simple configuration.

It may be preferable that the through-flow passage has a stepped shape such that the through-flow passage has an opening which is larger on a side of the throttle portion than a side of the closing portion side. According to this preferable configuration, since a small-diameter flow passage of the through-flow passage forms the closing region, and a large-diameter flow passage of the through-flow passage forms the control region, the closing portion and the throttle portion have a simple configuration.

It may be preferable that the through-flow passage is partially defined by a tapered surface formed in the throttle portion. According to this preferable configuration, when switching from the closing region to the control region is performed, and when switching from the control region to the closing region is performed, the flow rate of the fluid changes gently.

BRIEF DESCRIPTION OF DRAWINGS

FIG. 14 is an enlarged cross-sectional view showing a valve chamber of a capacity control valve as a valve according to a fourth embodiment of the present invention.

FIG. 15 is an enlarged cross-sectional view showing a valve chamber of a capacity control valve in a first modification example in the fourth embodiment of the present invention.

FIG. 16 is an enlarged cross-sectional view showing a valve chamber of a capacity control valve in a second modification example in the fourth embodiment of the present invention.

FIG. 17 is an enlarged cross-sectional view showing a valve chamber of a capacity control valve in a third modification example in the fourth embodiment of the present invention.

DESCRIPTION OF EMBODIMENTS

Modes for carrying out a valve according to the present invention will be described below based on embodiments. Incidentally, in the embodiments, a capacity control valve will be described as an example, but the present invention is applicable to other uses.

First Embodiment

Figure 1:
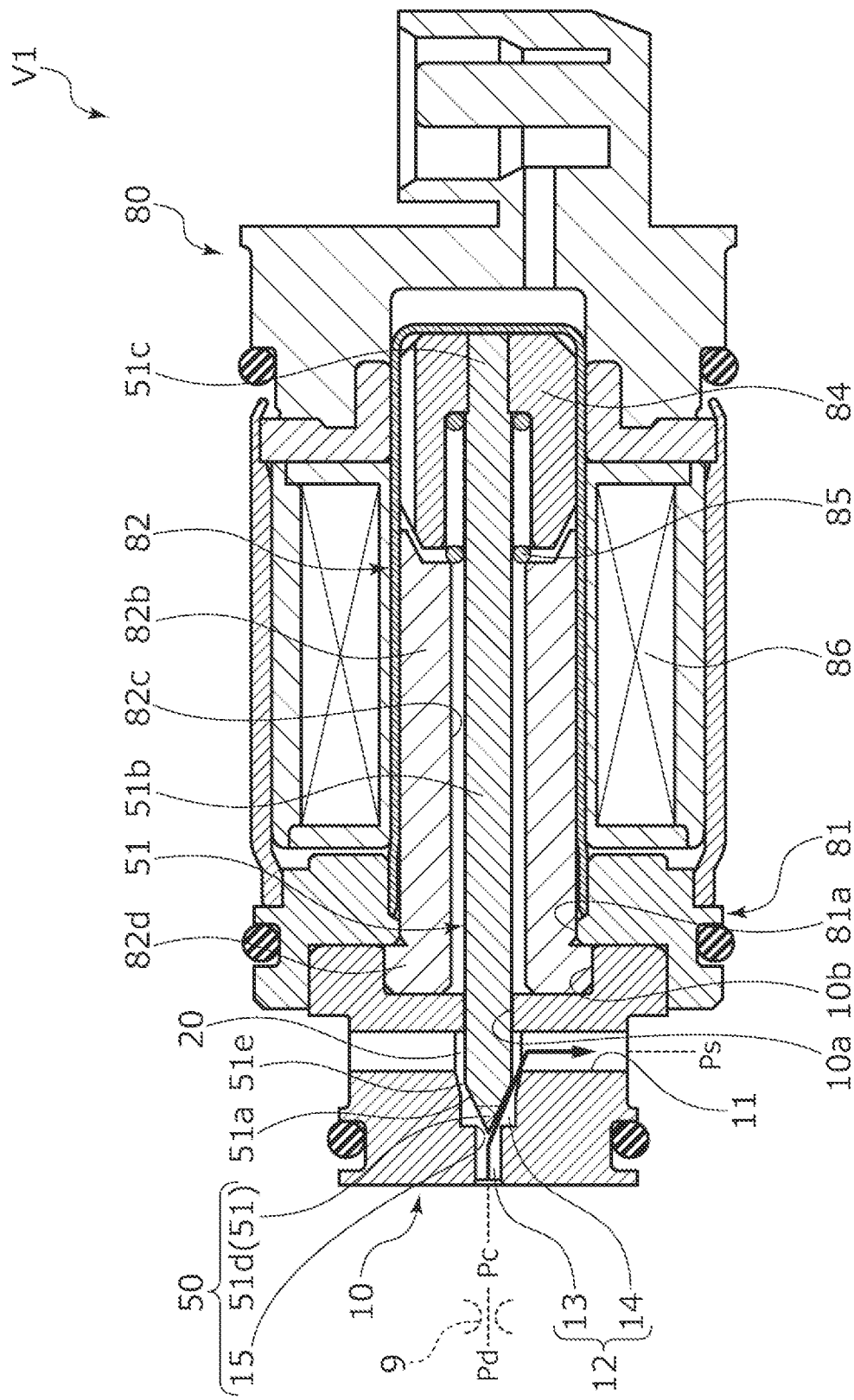
FIG. 1 is a cross-sectional view showing a state where a valve is opened in a non-energized state of a capacity control valve as a valve according to a first embodiment of the present invention.
Figure 2:
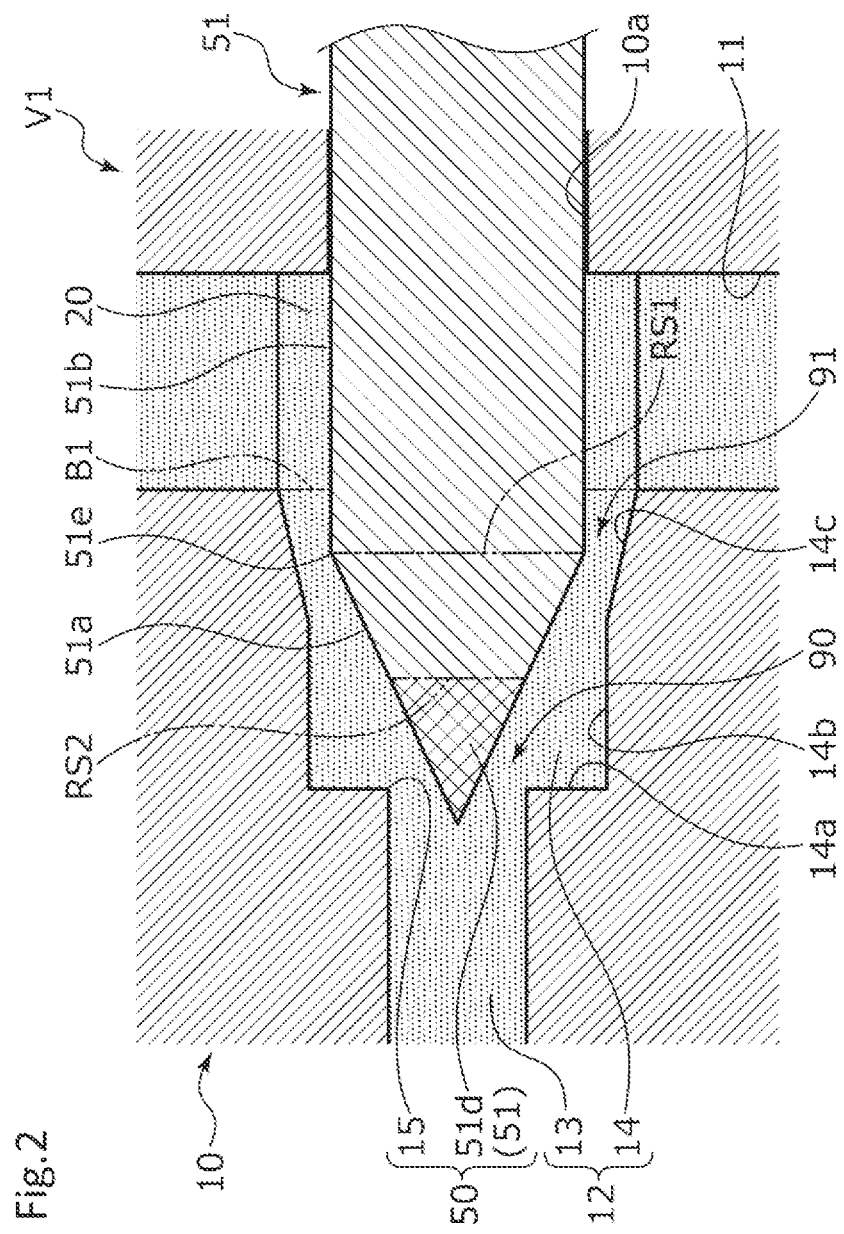
FIG. 2 is an enlarged cross-sectional view showing a valve chamber of the capacity control valve in the first embodiment.

A capacity control valve as a valve according to a first embodiment of the present invention will be described with reference to FIGS. 1 to 7. Hereinafter, a description will be given based on the assumption that the left and the right when seen from the front of FIG. 1 are the left and the right of the capacity control valve. In detail, a description will be given based on the assumption that a left side of the drawing sheet on which a valve housing 10 is disposed is a left side of the capacity control valve and a right side of the drawing sheet on which a solenoid 80 as a drive source is disposed is a right side of the capacity control valve.

The capacity control valve of the present invention is assembled into a variable displacement compressor (not shown) used for an air conditioning system of an automobile, etc., and by variably controlling the pressure of a working fluid (hereinafter, simply referred to as a "fluid") that is a refrigerant, controls the discharge amount of the variable displacement compressor to adjust the air conditioning system to have a target cooling capacity.

First, the variable displacement compressor will be described. The variable displacement compressor includes a casing including a discharge chamber, a suction chamber, a control chamber, and a plurality of cylinders. Incidentally, the variable displacement compressor is provided with a communication passage that provides direct communication between the discharge chamber and the control chamber. The communication passage is provided with a fixed orifice 9 that balances the pressures of the discharge chamber and the control chamber (refer to FIG. 1)

In addition, the variable displacement compressor includes a rotating shaft, a swash plate, and a plurality of pistons. The rotating shaft is rotationally driven by an engine (not shown) installed outside the casing. The swash plate is coupled to the rotating shaft so as to be tiltable by a hinge mechanism in the control chamber. The plurality of pistons are coupled to the swash plate and are reciprocatably fitted in the respective cylinders. The variable displacement compressor continuously changes the tilt angle of the swash plate by appropriately controlling pressure in the control chamber while utilizing a suction pressure Ps of the suction chamber that suctions the fluid, a discharge pressure Pd of the discharge chamber that discharges the fluid pressurized by the pistons, and a control pressure Pc of the control chamber that houses the swash plate, by means of the capacity control valve V1 to be driven to open and close by electromagnetic force, and thus changes the stroke amount of the pistons to control the discharge amount of the fluid.

As shown in FIG. 1, the capacity control valve V1 of the first embodiment assembled into the variable displacement compressor adjusts an electric current that energizes a coil 86 forming the solenoid 80, to perform opening and closing control of a CS valve 50 in the capacity control valve V1. Accordingly, the fluid flowing out from the control chamber to the suction chamber is controlled to variably control the control pressure Pc in the control chamber. Incidentally, a discharge fluid of the discharge pressure Pd of the discharge chamber is constantly supplied to the control chamber via the fixed orifice 9, and the CS valve 50 in the capacity control valve V1 is closed, so that the control pressure Pc in the control chamber is increased.

In the capacity control valve V1 of the first embodiment, the CS valve 50 includes a CS valve body 51 as a valve body and a CS valve seat 15 formed in an inner peripheral surface of the valve housing 10. In addition, the CS valve body 51 comes into contact with and separates from the CS valve seat 15 in an axial direction to open and close the CS valve 50.

Next, a structure of the capacity control valve V1 will be described. As shown in FIG. 1, the capacity control valve V1 mainly includes the valve housing 10, the CS valve body 51, and the solenoid 80. The valve housing 10 is made of a metallic material. The CS valve body 51 is disposed inside the valve housing 10 so as to be reciprocatable in the axial direction. The solenoid 80 is connected to the valve housing 10 to exert a driving force on the CS valve body 51.

As shown in FIG. 1, the solenoid 80 mainly includes a casing 81, a center post 82, the CS valve body 51, a movable iron core 84, a coil spring 85, and the coil 86 for excitation. The casing 81 includes an opening portion 81a that is open to the left in the axial direction. The center post 82 is inserted into the opening portion 81a of the casing 81 from the left in the axial direction to be disposed between a radially inner side of the casing 81 and a radially inner side of the valve housing 10, and has a substantially cylindrical shape. The CS valve body 51 is inserted into the center post 82 to be reciprocatable in the axial direction, and an axially left end portion of the CS valve body 51 is disposed inside the valve housing 10. An axially right end portion of the CS valve body 51 is inserted and fixed to the movable iron core 84. The coil spring 85 is provided between the center post 82 and the movable iron core 84 to urge the movable iron core 84 to the right in the axial direction, which is a valve opening direction of the CS valve 50. The coil 86 is wound on an outer side of the center post 82 with a bobbin interposed therebetween.

The center post 82 includes a cylindrical portion 82b and a flange portion 82d having an annular shape. The cylindrical portion 82b is made of a rigid body that is a magnetic material such as iron or silicon steel, and an insertion hole 82c which extends in the axial direction and into which the CS valve body 51 is inserted is formed in the cylindrical portion 82b. The flange portion 82d extends from an outer peripheral surface of an axially left end portion of the cylindrical portion 82b in a radially outward direction.

As shown in FIG. 1, the CS valve body 51 includes a tapered portion 51a, a large-diameter portion 51b as a base portion, and a small-diameter portion 51c, and also serves as a rod that is disposed through the coil 86 of the solenoid 80. The tapered portion 51a is made of a metallic material or a resin material, and is a conical body having an isosceles triangular shape in a cross-sectional view which is tapered toward a tip, namely, an axially left end. The large-diameter portion 51b is a circular columnar body having a constant cross section. The small-diameter portion 51c extends from a radially inner side of an axially right end of the large-diameter portion 51b to the right in the axial direction.

In the tapered portion 51a of the CS valve body 51, a portion that includes a portion to be seated on the CS valve seat 15 and that is located on a tip side with respect to the portion to be seated is referred to as a contact portion 51d as a tip portion that can be seated on the CS valve seat 15 (refer to a cross hatching in FIGS. 1 to 5). The CS valve 50 of the present embodiment has a poppet valve structure.

A maximum cross-sectional area RS2 (refer to FIG. 2) of the contact portion 51d in a radial direction is substantially the same as a pressure-receiving area of the CS valve seat 15 (namely, an inner diameter cross-sectional area of a small-diameter flow passage 13), and is narrower than a cross-sectional area RS1 (refer to FIG. 2) of the large-diameter portion 51b in the radial direction (RS2<RS1).

In addition, a boundary between the tapered portion 51a and the large-diameter portion 51b of the CS valve body 51 is a corner portion 51e. Incidentally, the cross-sectional area RS1 of the corner portion 51e and the cross-sectional area RS1 of the large-diameter portion 51b (refer to FIG. 2) are the same.

As shown in FIG. 1, a Ps port 11 and a Pc port 13 are formed in the valve housing 10. The Ps port 11 communicates with the suction chamber of the variable displacement compressor. The Pc port 13 communicates with the control chamber of the variable displacement compressor.

The Pc port 13 (may be referred to as the small-diameter flow passage 13) is communicatively connected to a large-diameter flow passage 14 having a larger diameter than that of the Pc port 13. The small-diameter flow passage 13 and the large-diameter flow passage 14 form a through-flow passage 12 of the present invention.

In addition, the CS valve seat 15 is formed at an opening end edge on a large-diameter flow passage 14 side of the small-diameter flow passage 13.

As shown in FIGS. 2 to 5, the large-diameter flow passage 14 includes a bottom portion 14a, a peripheral wall surface 14b, and a tapered surface 14c. The CS valve seat 15 is formed at an inner end of the bottom portion 14a, and the bottom portion 14a extends in the radially outward direction substantially orthogonally to the axial direction. The peripheral wall surface 14b extends to the right in the axial direction substantially orthogonally to a radially outer end of the bottom portion 14a. The tapered surface 14c is gradually increased in diameter from an axially right end of the peripheral wall surface 14b toward the right in the axial direction.

As shown in FIG. 1, a valve chamber 20 is formed inside the valve housing 10, and the axially left end portion of the CS valve body 51 is disposed in the valve chamber 20 so as to be reciprocatable in the axial direction. In addition, the Ps port 11 extends from an outer peripheral surface of the valve housing 10 in a radially inward direction to communicate with the valve chamber 20, and the large-diameter flow passage 14 forms a part of the valve chamber 20. Incidentally, in FIGS. 1 to 5, for convenience of description, a boundary of a through-flow passage 12 portion in the valve chamber 20 is indicated by an imaginary alternate long and two short dashed line Bl.

A guide hole 10a on which an outer peripheral surface of the CS valve body 51 is slidable in a substantially sealed state is formed on a solenoid 80 side of the valve housing 10 with respect to the valve chamber 20. Incidentally, an inner peripheral surface of the guide hole 10a and the outer peripheral surface of the CS valve body 51 are slightly separated from each other in the radial direction to form a very small gap therebetween, and the CS valve body 51 is smoothly movable relative to the valve housing 10 in the axial direction.

In addition, a recessed portion 10b recessed to the left in the axial direction is formed on a radially inner side of an axially right end portion of the valve housing 10, and the flange portion 82d of the center post 82 is inserted and fixed to the recessed portion 10b from the right in the axial direction in a substantially sealed state, and the casing 81 is inserted and fixed to the valve housing 10 from the right in the axial direction in a substantially sealed state, so that the valve housing 10, the center post 82, and the casing 81 are integrally connected to each other. Incidentally, an opening end on the solenoid 80 side of the guide hole 10a is formed on a radially inner side of a bottom surface of the recessed portion 10b of the valve housing 10.

In addition, in the capacity control valve V1, when the CS valve body 51 is inserted into the large-diameter flow passage 14 of the valve housing 10, since the large-diameter flow passage 14 includes the tapered surface 14c (refer to FIG. 2), a tapered surface of the tapered portion 51a and an outer peripheral surface of the large-diameter portion 51b come into contact with the tapered surface 14c to be guided in the radial direction, so that the alignment between the CS valve body 51 and the large-diameter flow passage 14 is facilitated.

Next, a mode in which the flow rate of the fluid that has flowed in from the Pc port 13 is controlled by a closing portion 90 and a throttle portion 91 formed of shortest places between the CS valve body 51 and the through-flow passage 12 will be described with reference to FIGS. 2 to 6.

The closing portion 90 includes the contact portion 51d of the CS valve body 51 and the CS valve seat 15, and can adjust an opening area x of the closing portion 90 according to a stroke st of the CS valve body 51. The opening area x of the closing portion 90 is a flow passage area between the contact portion 51d and the CS valve seat 15.

Figure 6:
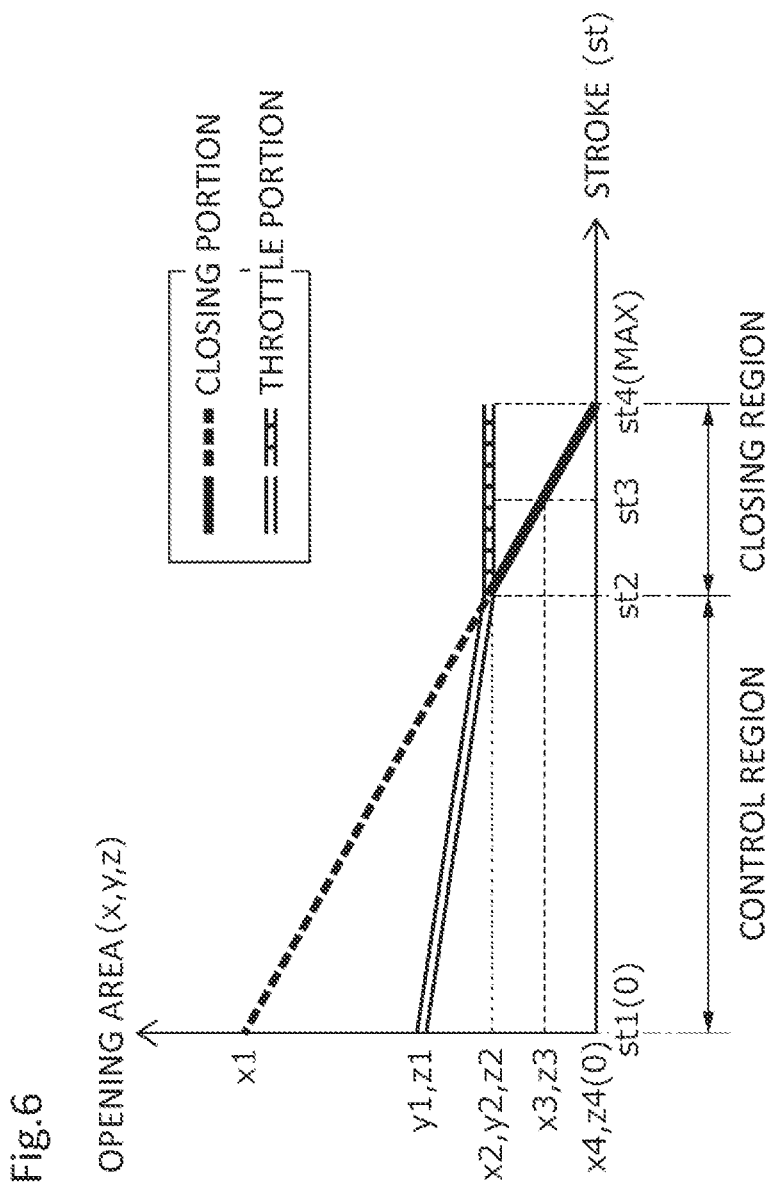
FIG. 6 is a graph for describing a transition of an opening area with the stroke of a valve body in the capacity control valve in the first embodiment.

In addition, since the contact portion 51d of the CS valve body 51 has a tapered shape, a shortest separation dimension between the contact portion 51d and the CS valve seat 15 gradually decreases as the contact portion 51d moves in a valve closing direction, so that as indicated by a black solid line and a black chain line in FIG. 6, the opening area x of the closing portion 90 gradually becomes narrower as the CS valve body 51 moves in the valve closing direction (x1≤x (st1≤st≤st4)≤x4).

Returning to FIGS. 2 to 5, the throttle portion 91 includes the corner portion 51e of the CS valve body 51 and the peripheral wall surface 14b and the tapered surface 14c of the large-diameter flow passage 14 of the through-flow passage 12, and can adjust an opening area y of the throttle portion 91 according to the stroke st of the CS valve body 51. The opening area y of the throttle portion 91 is a flow passage area between the corner portion 51e and the peripheral wall surface 14b or the tapered surface 14c.

In addition, since a tilt angle of the tapered surface 14c of the through-flow passage 12 with respect to the axial direction is smaller than a tilt angle of the tapered surface of the tapered portion 51a of the CS valve body 51 with respect to the same axial direction, the opening area y of the throttle portion 91 changes depending on the position of the corner portion 51e.

In addition, when a stroke range of the corner portion 51e of the CS valve body 51 is a range within the peripheral wall surface 14b, namely, a closing region to be described, the opening area y of the throttle portion 91 is constant as indicated by a white chain line in FIG. 6 (y (st2<st≤st4)=y2). In detail, a shortest separation dimension between the corner portion 51e and the peripheral wall surface 14b is shorter than a shortest separation dimension between the corner portion 51e and the tapered surface 14c, and the shortest separation dimension between the corner portion 51e and the peripheral wall surface 14b in the same range is constant.

In addition, when a stroke range of the corner portion 51e of the CS valve body 51 is a range within the tapered surface 14c, namely, a control region to be described, as indicated by a white solid line in FIG. 6, the opening area y of the throttle portion 91 gradually becomes narrower as the CS valve body 51 moves in the valve closing direction (y1≤y (st1≤st≤st2)≤y2). In detail, a shortest separation dimension between the corner portion 51e and the tapered surface 14c is shorter than a shortest separation dimension between the corner portion 51e and the peripheral wall surface 14b, and the shortest separation dimension between the corner portion 51e and the tapered surface 14c in the same range gradually decreases as the corner portion 51e moves in the valve closing direction.

Next, the operation of the capacity control valve V1 during normal control, mainly, an opening and closing operation of the CS valve 50 will be described with reference to FIGS. 1 to 7. Incidentally, an effective pressure-receiving area in the present specification is a pressure-receiving area that mainly affects the stroke st of the CS valve body 51 when the CS valve body 51 receives pressure from the fluid, out of the opening area x of the closing portion 90 and the opening area y of the throttle portion 91 that can function as a pressure-receiving area. In addition, the pressure of the fluid that affects the stroke st of the CS valve body 51 is mainly the control pressure Pc, accurately a differential pressure between the control pressure Pc and the suction pressure Ps.

As shown in FIG. 1, in a non-energized state of the capacity control valve V1, the movable iron core 84 is pressed to the right in the axial direction by the urging force of the coil spring 85, so that the CS valve body 51 is pressed to the right in the axial direction. At this time, the solenoid 80 is not in operation, a stroke st1 of the CS valve body 51 is 0, and the CS valve 50 is opened (corresponding to FIG. 2).

Figure 7:
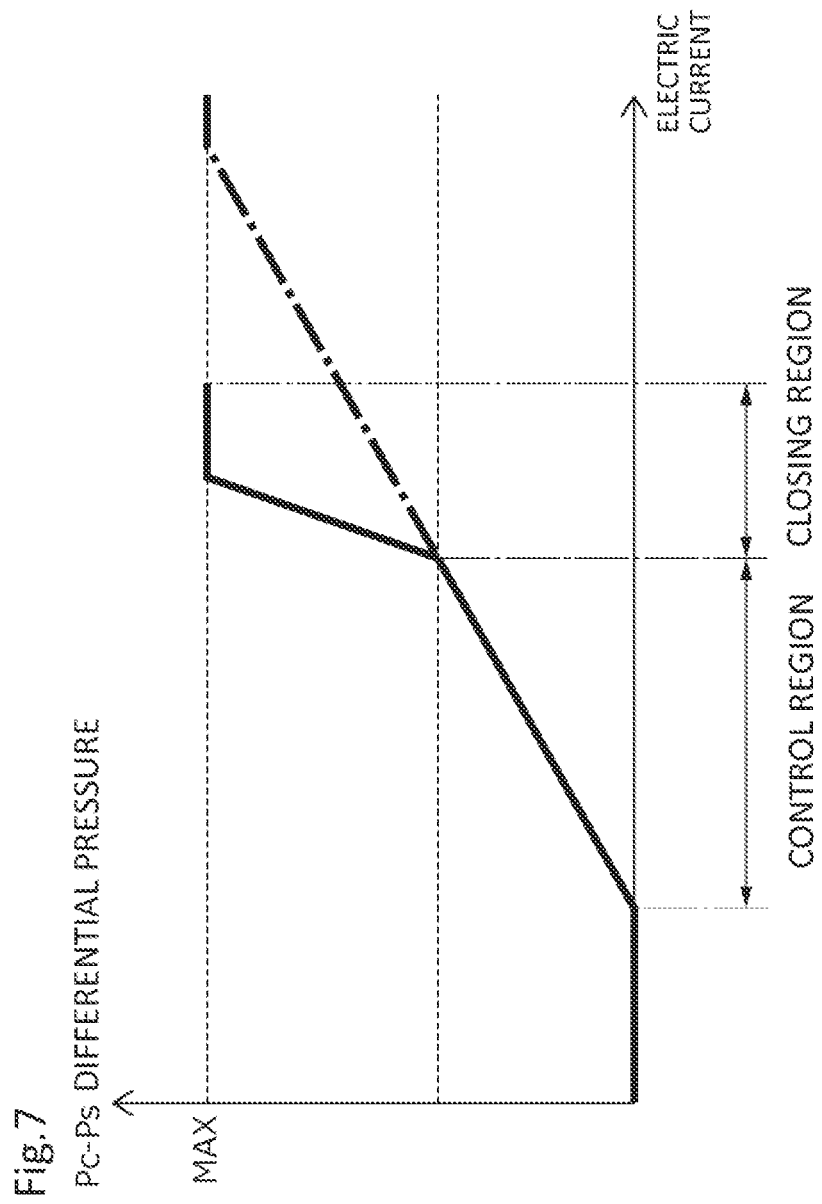
FIG. 7 is a graph for describing an electric current used for the stroke of the valve body and a transition of a Pc–Ps differential pressure in the capacity control valve in the first embodiment.

In addition, with reference to FIG. 7, as indicated by a black solid line, until the energization of the capacity control valve V1 is started, the energization electric current is a predetermined value or more, and a driving force generated by the solenoid 80 is larger than the urging force of the coil spring 85 and a force acting on the CS valve body 51 from the fluid, the stroke st of the CS valve body 51 remains st1(0).

As indicated by the black solid line in FIG. 7, when the energization of the capacity control valve V1 is started and the energization electric current is the predetermined value or more, the CS valve body 51 moves to the left in the axial direction.

Figure 4:
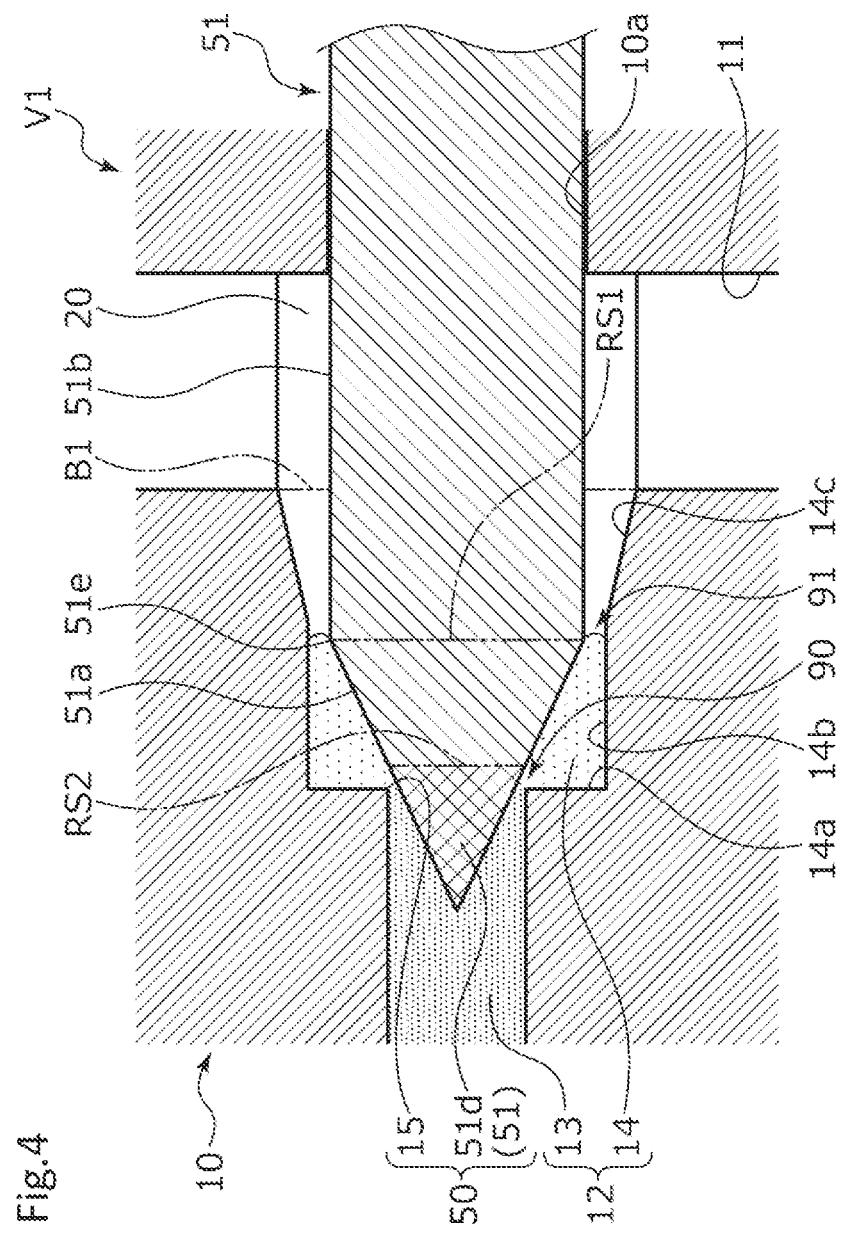
FIG. 4 is an enlarged cross-sectional view showing the valve chamber of the capacity control valve in the first embodiment.
Figure 5:
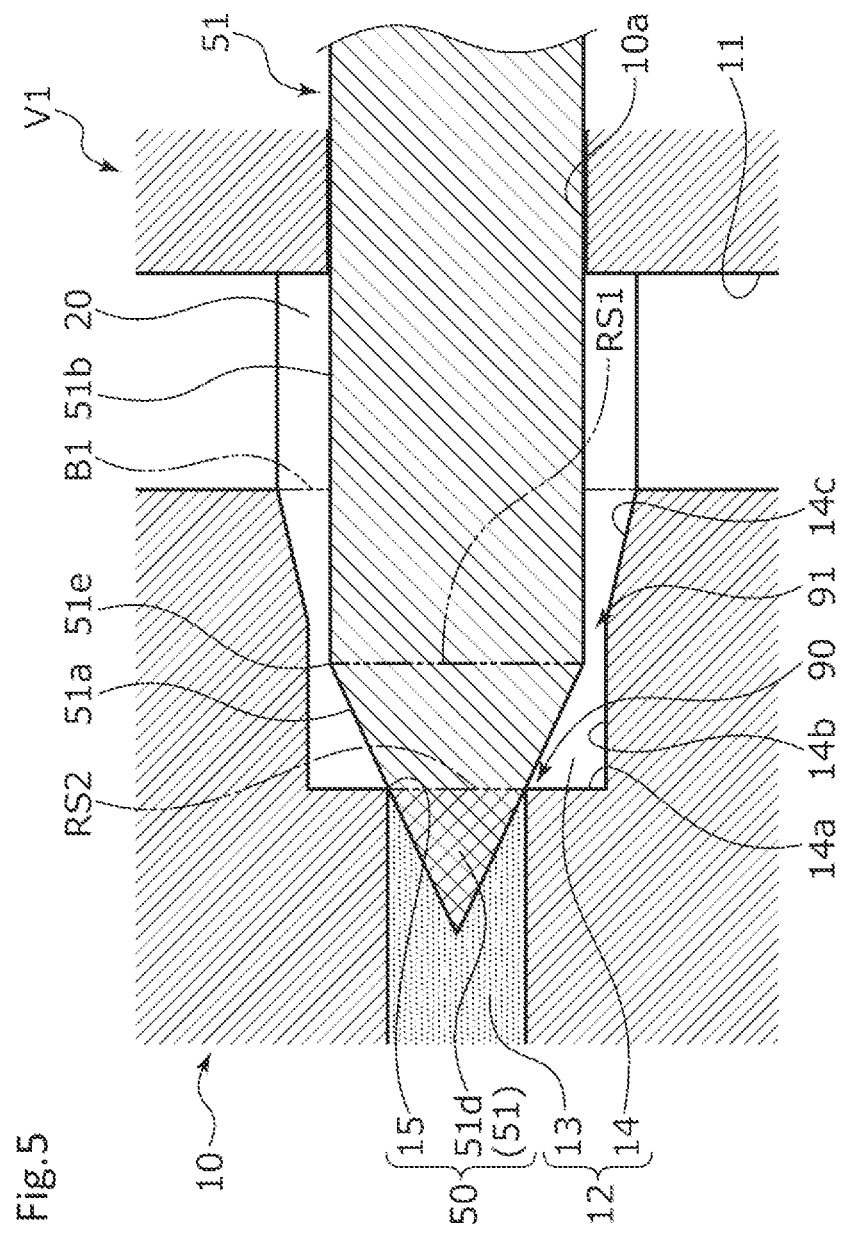
FIG. 5 is an enlarged cross-sectional view showing the valve chamber of the capacity control valve in the first embodiment.

Thereafter, with reference to FIG. 6, as the energization electric current increases, the stroke st of the CS valve body 51 increases in order of st2 (corresponding to FIG. 3), st3 (corresponding to FIG. 4), and st4 (corresponding to FIG. 5).

At a stroke st4, the contact portion 51d of the CS valve body 51 is seated on the CS valve seat 15, and the CS valve 50 is closed. At this time, the stroke st of the CS valve body 51 is maximized.

With reference to FIG. 6, when the stroke st of the CS valve body 51 is st1, the opening area x of the closing portion 90 is x1, and the opening area y of the throttle portion 91 is y1. In addition, an opening area x1 is wider than an opening area y1 (x1>y1), and a flow rate of a control fluid that can pass through the throttle portion 91 is smaller than a flow rate of the control fluid that can pass through the closing portion 90. The opening areas x1 and y1 are maximum opening areas in the present embodiment, and since both the opening areas x1 and y1 are sufficiently wide, the flow rate of the control fluid that can pass through the closing portion 90 and through the throttle portion 91 is its maximum, and as indicated by a fine dot pattern in FIG. 2, the control fluid of the control pressure Pc flows from the Pc port 13 into a space from the small-diameter flow passage 13 in the through-flow passage 12 to the Ps port 11. At this time, an opening area z of the CS valve 50 is z1 that is the opening area y1 of the throttle portion 91.

With reference to FIG. 6, when the stroke st of the CS valve body 51 is st2, the opening area x of the closing portion 90 is x2, and the opening area y of the throttle portion 91 is y2. In addition, an opening area x2 is wider than an opening area y2 (x2>y2), and a flow rate of the control fluid that can pass through the throttle portion 91 is smaller than a flow rate of the control fluid that can pass through the closing portion 90. At this time, the opening area z of the CS valve 50 is z2 that is the opening area y2 of the throttle portion 91.

Figure 3:
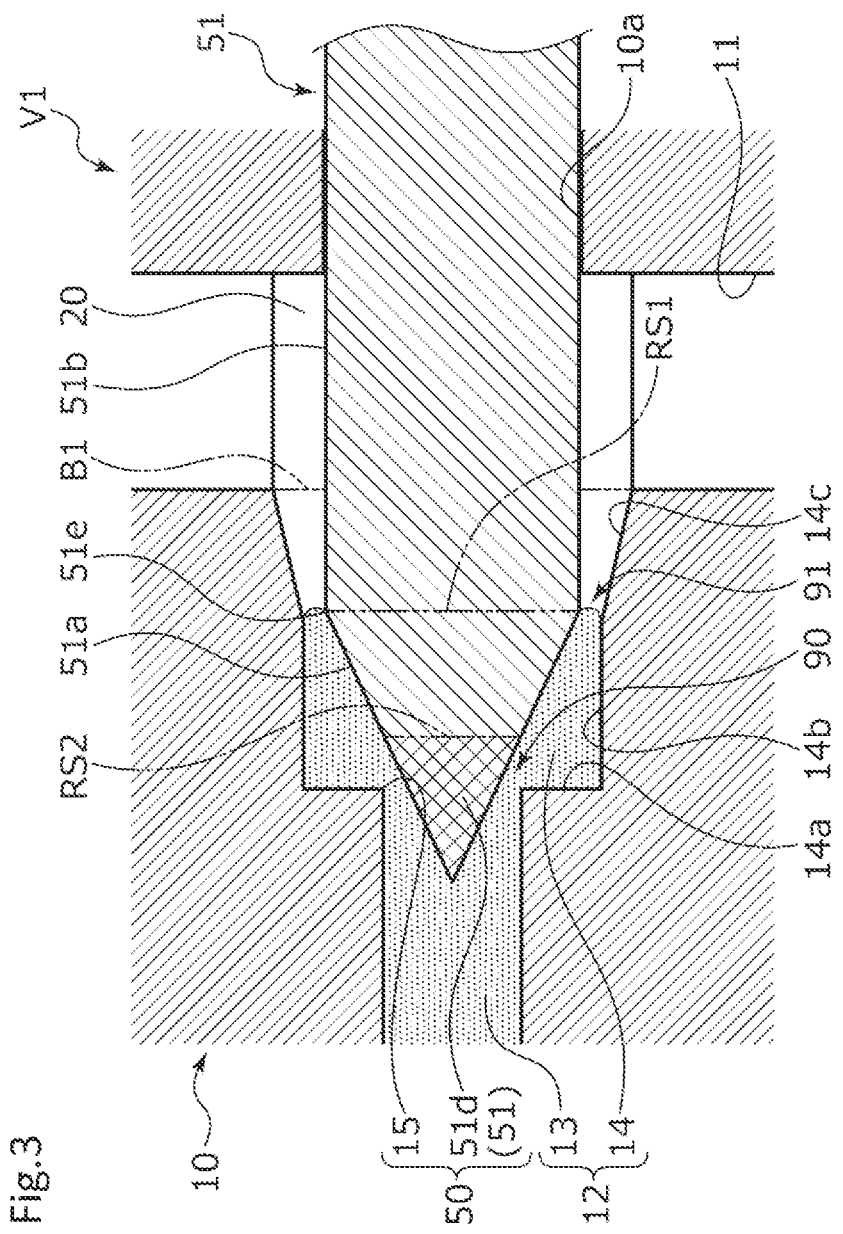
FIG. 3 is an enlarged cross-sectional view showing the valve chamber of the capacity control valve in the first embodiment.

Accordingly, as indicated by a fine dot pattern in FIG. 3, a space from the small-diameter flow passage 13 in the through-flow passage 12 to the throttle portion 91 is substantially filled with the control fluid of the control pressure Pc that has flowed in from the Pc port 13.

As indicated by the black chain line and the white solid line in FIG. 6, in a stroke range st1≤st≤st2 of the CS valve body 51, as the stroke makes the transition from st1 to st2, the opening area of the closing portion 90 and the opening area of the throttle portion 91 gradually decrease. The opening area y of the throttle portion 91 is narrower than the opening area x of the closing portion 90 until immediately before a stroke st2, and the opening area y is substantially the same as the opening area x at the stroke st2. For this reason, the flow rate of the control fluid flowing into the valve chamber 20 from the Pc port 13 can be adjusted according to the opening area y of the throttle portion 91. At this time, a small Pc–Ps differential pressure mainly acts on the tapered portion 51a of the CS valve body 51. Namely, the cross-sectional area RS1 of the large-diameter portion 51b of the CS valve body 51 is an effective pressure-receiving area.

Incidentally, the stroke range st1≤st≤st2 of the CS valve body 51 is the control region in the present embodiment (refer to FIGS. 6 and 7).

With reference to FIG. 6, when the stroke st of the CS valve body 51 is st3, the opening area x of the closing portion 90 is x3, and the opening area y of the throttle portion 91 is y2. In addition, an opening area x3 is narrower than the opening area y2 (x3<y2), and a flow rate of the control fluid that can pass through the closing portion 90 is smaller than a flow rate of the control fluid that can pass through the throttle portion 91. At this time, the opening area z of the CS valve 50 is z3 that is the opening area x3 of the closing portion 90.

Accordingly, as indicated by a fine dot pattern in FIG. 4, a space from the small-diameter flow passage 13 in the through-flow passage 12 to the closing portion 90 is substantially filled with the control fluid of the control pressure Pc that has flowed in from the Pc port 13. In addition, since the opening area x of the closing portion 90 is wider than the opening area y of the throttle portion 91 in a space from the closing portion 90 to the throttle portion 91, as indicated by a coarse dot pattern in FIG. 4, a pressure of the fluid in the space that has passed through the closing portion 90 is lower than a pressure of the fluid before passing through the closing portion 90.

As described above, in a stroke range st2<st st3 of the CS valve body 51, a large Pc–Ps differential pressure acts on the CS valve body 51. Specifically, a high pressure acts on the contact portion 51d of the tapered portion 51a, and a small pressure acts on the tapered portion 51a on a downstream side of the contact portion 51d. Namely, the cross-sectional area RS2 of the contact portion 51d of the CS valve body 51 is an effective pressure-receiving area.

With reference to FIG. 6, when the stroke st of the CS valve body 51 is st4, the opening area x of the closing portion 90 is x4, and the opening area y of the throttle portion 91 is y2. In addition, an opening area x4 is narrower than the opening area y2 (x4<y2) and is 0, namely, the CS valve 50 is closed, and the opening area z of the CS valve 50 is z4 that is the opening area x4 of the closing portion 90.

Accordingly, as indicated by a fine dot pattern in FIG. 5, the space from the small-diameter flow passage 13 in the through-flow passage 12 to the closing portion 90 is substantially filled with the control fluid of the control pressure Pc that has flowed in from the Pc port 13. In addition, since the flow rate of the fluid flowing through the closing portion 90 is 0 in the space from the closing portion 90 to the throttle portion 91, the space is filled with the fluid of the suction pressure Ps.

As described above, in a stroke range st3<st st4 of the CS valve body 51, a larger Pc–Ps differential pressure acts on the CS valve body 51. Specifically, a high pressure acts on the contact portion 51d of the tapered portion 51a. Namely, the cross-sectional area RS2 of the contact portion 51d of the CS valve body 51 is an effective pressure-receiving area.

Incidentally, a stroke range st2<st st4 of the CS valve body 51 is a closing region in the present embodiment (refer to FIG. 6).

In addition, the configuration is such that with respect to the stroke st2 as a reference, the opening area x of the closing portion 90 is narrower than the opening area y of the throttle portion 91 and switching between the control region and the closing region is performed.

As described above, in the closing region (st2<st st4) of the CS valve body 51, the cross-sectional area RS2 narrower than the cross-sectional area RS1 is an effective pressure-receiving area, and a force that the CS valve body 51 receives from the fluid is reduced. For this reason, the driving force of the solenoid 80 that drives the CS valve body 51 when the valve is closed can be reduced (refer to FIG. 7). In addition, since an increase rate of the Pc–Ps differential pressure is small in the control region (st1≤st<st2), the flow rate can be accurately adjusted according to the electric current (refer to FIG. 7).

In addition, for example, in a configuration where the effective pressure-receiving area of the valve body in the control region is substantially the same as the effective pressure-receiving area of the valve body in the closing region, an electric current required from when the valve is closed until the Pc−Ps differential pressure is maximized as indicated by an alternate long and short dashed line in FIG. 7 is larger than an electric current required from when the CS valve 50 is closed until the Pc−Ps differential pressure is maximized in the present embodiment as indicated by a solid line in FIG. 7.

Further, when a structure is adopted in which an effective pressure-receiving area of the valve body in the control region is substantially the same as an effective pressure-receiving area of the valve body in the closing region and a reduction rate of the opening area with respect to the stroke st is large, the valve can be closed with substantially the same electric current as in the present invention, but since an increase rate of the Pc−Ps differential pressure in the control region is large, the accuracy of control in the control region is inferior to that of the present embodiment.

As described above, in the capacity control valve V1 of the present embodiment, the flow rate in the closing region and the flow rate in the control region can be individually adjusted by the closing portion 90 and the throttle portion 91. For this reason, the effective pressure-receiving area in the closing region can be narrowed by performing switching between the cross-sectional area RS2 as an effective pressure-receiving area in the closing region and the cross-sectional area RS1 as an effective pressure-receiving area in the control region according to the stroke st of the CS valve body 51. The effective pressure-receiving area in the closing region is also referred to as a closing regional effective pressure-receiving area and the effective pressure-receiving area in the control region is also referred to as a control reginal effective pressure-receiving area.

In addition, since the opening area y2 of the throttle portion 91 in the closing region is constant, in a state where switching to the closing region is performed, the influence of the fluid passing through the throttle portion 91 on the CS valve body 51 can be reduced.

In addition, since the closing portion 90 has a poppet valve structure including the CS valve body 51 that is a conical body having an isosceles triangular shape in a cross-sectional view, and the CS valve seat 15, the sealing property when the valve is closed can be improved.

In addition, since the tapered portion 51a of the CS valve body 51 is formed in a tapered shape, and the contact portion 51d is inserted into the small-diameter flow passage 13 of the through-flow passage 12 and is seated on the CS valve seat 15, a stable sealing property when the contact portion 51d is seated on the CS valve seat 15 can be secured.

Incidentally, the contact portion 51d of the CS valve body 51 is not limited to a conical body having an isosceles triangular shape in a cross-sectional view as long as the configuration is such that the contact portion 51d can be seated on the CS valve seat 15 and the effective pressure-receiving area in the closing region is narrower than the effective pressure-receiving area in the control region.

In addition, in the CS valve body 51, the maximum cross-sectional area of the contact portion 51d is narrower than the cross-sectional area of the large-diameter portion 51b, the cross-sectional area of the contact portion 51d is the cross-sectional area RS2 as an effective pressure-receiving area in the closing region, and the cross-sectional area of the large-diameter portion 51b is the cross-sectional area RS1 as an effective pressure-receiving area in the control region, so that the CS valve body 51 can be simply configured.

In addition, since the through-flow passage 12 has a stepped shape in which the large-diameter flow passage 14 forming the throttle portion 91 is wider than the small-diameter flow passage 13 forming the closing portion 90 in the radial direction, the small-diameter flow passage 13 of the through-flow passage 12 forms the closing portion 90, and the large-diameter flow passage 14 of the through-flow passage 12 forms the throttle portion 91, so that the closing portion 90 and the throttle portion 91 can be simply configured.

In addition, since the through-flow passage 12 includes the tapered surface 14c forming the throttle portion 91, when switching from the closing region to the control region is performed and when switching from the control region to the closing region is performed, the flow rate of the fluid can be gently changed.

In addition, since a space having a rectangular shape in a cross-sectional view is formed in the through-flow passage 12 by the bottom portion 14a and the peripheral wall surface 14b, the control fluid is likely to stay in the space in the control region, so that switching between the cross-sectional area RS2 as an effective pressure-receiving area in the closing region and the cross-sectional area RS1 as an effective pressure-receiving area in the control region can be more reliably performed according to the stroke st of the CS valve body 51.

Incidentally, in the present embodiment, a mode in which the opening area y of the throttle portion 91 is narrower than or substantially the same as the opening area x of the closing portion 90 in the control region has been provided as an example, but the present invention is not limited to the mode, and the opening areas x and y in the control region with respect to the stroke st of the CS valve body 51 may be substantially the same from the stroke st1 to st2. In such a mode, in the stroke range (st1≤st<st2) of the control region, the opening area x with respect to the stroke st of the CS valve body 51 is the same as the opening area y with respect to the same stroke st, and in the entire stroke range (st1≤st≤st4), the opening area z of the CS valve 50 with respect to the stroke st of the CS valve body 51 is the same as the opening area x with respect to the same stroke st.

Second Embodiment

A capacity control valve as a valve according to a second embodiment of the present invention will be described with reference to FIG. 8. Incidentally, a description of duplicated configurations that are the same as the configurations of the first embodiment will be omitted.

Figure 8:
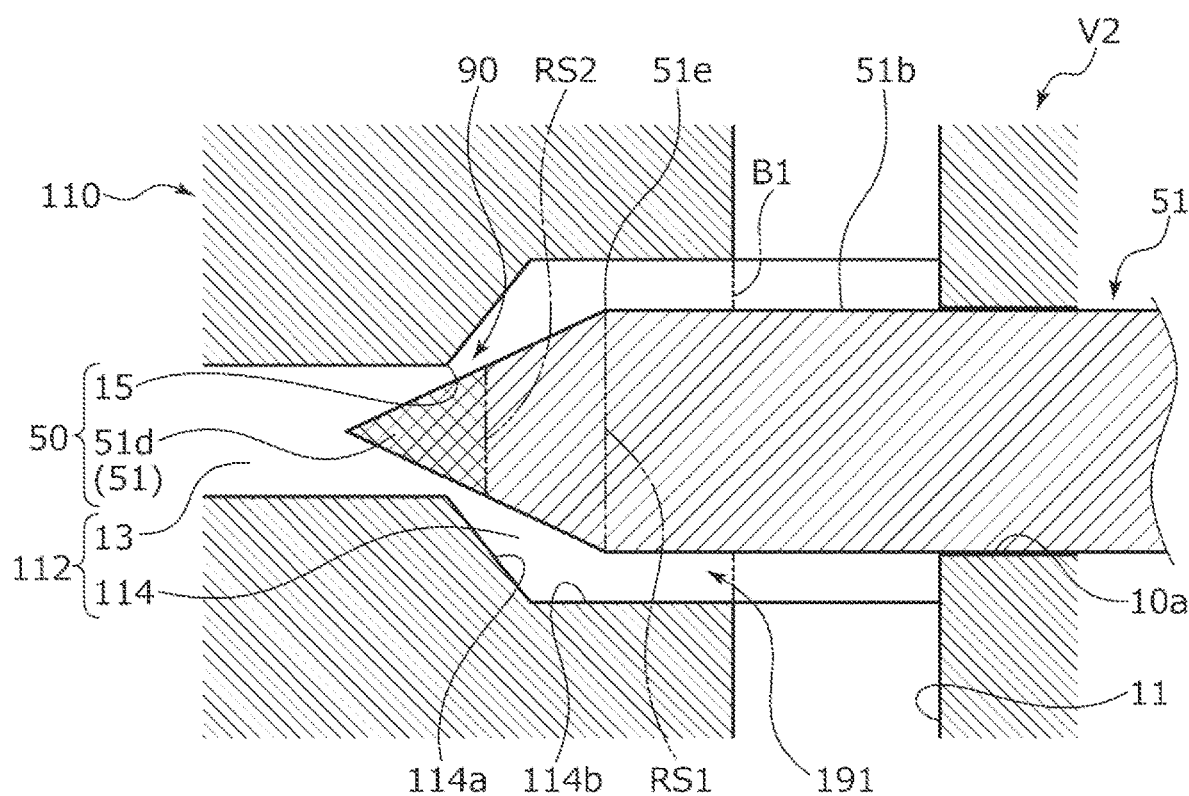
FIG. 8 is an enlarged cross-sectional view showing a valve chamber of a capacity control valve as a valve according to a second embodiment of the present invention.

As shown in FIG. 8, in a capacity control valve V2 in the second embodiment of the present invention, a large-diameter flow passage 114 of a through-flow passage 112 formed in a valve housing 110 includes a bottom portion 114a and a peripheral wall surface 114b. The CS valve seat 15 is formed at an inner end of the bottom portion 114a, and the bottom portion 114a is formed in a tapered shape that is gradually increased in diameter toward the right in the axial direction. The peripheral wall surface 114b extends from a radially outer end of the bottom portion 114a to the right in the axial direction substantially in parallel to the axial direction.

As described above, even in a configuration where an opening area y of a throttle portion 191 is constant regardless of the stroke st of the CS valve body 51, when the opening area x of the closing portion 90 is narrower than the opening area y of the throttle portion 191, the effective pressure-receiving area switches from the cross-sectional area RS1 to the cross-sectional area RS2, so that the driving force of the solenoid 80 that drives the CS valve body 51 when the valve is closed can be reduced.

In addition, in the through-flow passage 112, the fluid that has passed through the closing portion 90 is guided by the bottom portion 114a having a tapered shape that is tilted along a direction in which the fluid flows, the flow of the fluid is unlikely to be disturbed. For this reason, the flow rate of the fluid flowing from the Pc port 13 can be more stably adjusted.

Third Embodiment

A capacity control valve V3 as a valve according to a third embodiment of the present invention will be described with reference to FIGS. 9 to 13. Incidentally, a description of duplicated configurations that are the same as the configurations of the first and second embodiments will be omitted.

Figure 9:
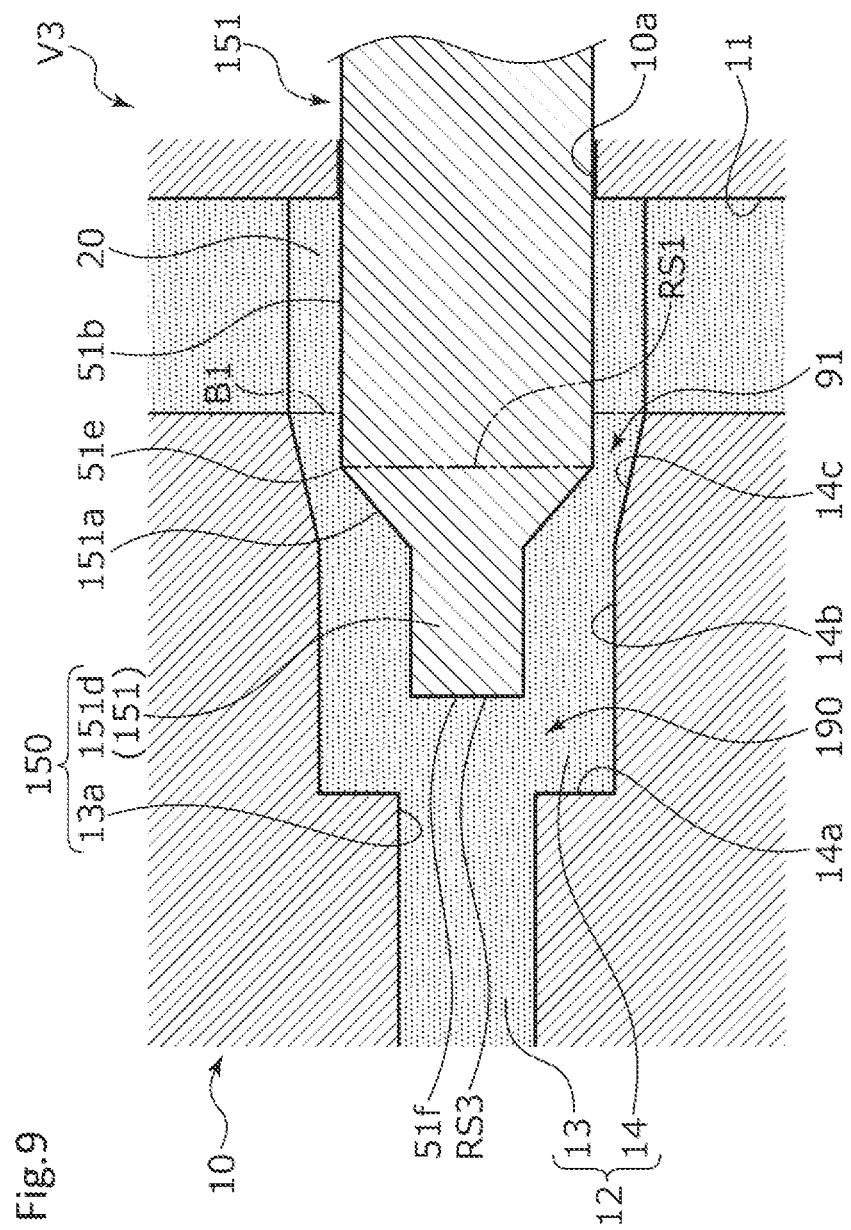
FIG. 9 is an enlarged cross-sectional view showing a valve chamber of a capacity control valve as a valve according to a third embodiment of the present invention.

As shown in FIG. 9, in the capacity control valve V3 in the third embodiment, a CS valve body 151 includes a columnar portion 151d as a tip portion having a constant cross section at an axially left end portion of a tapered portion 151a, and a cross-sectional area RS3 of the columnar portion 151d is slightly narrower than the inner diameter cross-sectional area of the small-diameter flow passage 13.

A CS valve 150 of the present embodiment has a spool valve structure.

A closing portion 190 includes the columnar portion 151d of the CS valve body 151 and a peripheral wall surface 13a of the small-diameter flow passage 13, and can adjust an opening area X of the closing portion 190 according to a stroke ST of the CS valve body 151. The opening area X of the closing portion 190 is a flow passage area between the columnar portion 151d and the peripheral wall surface 13a.

Figure 13:
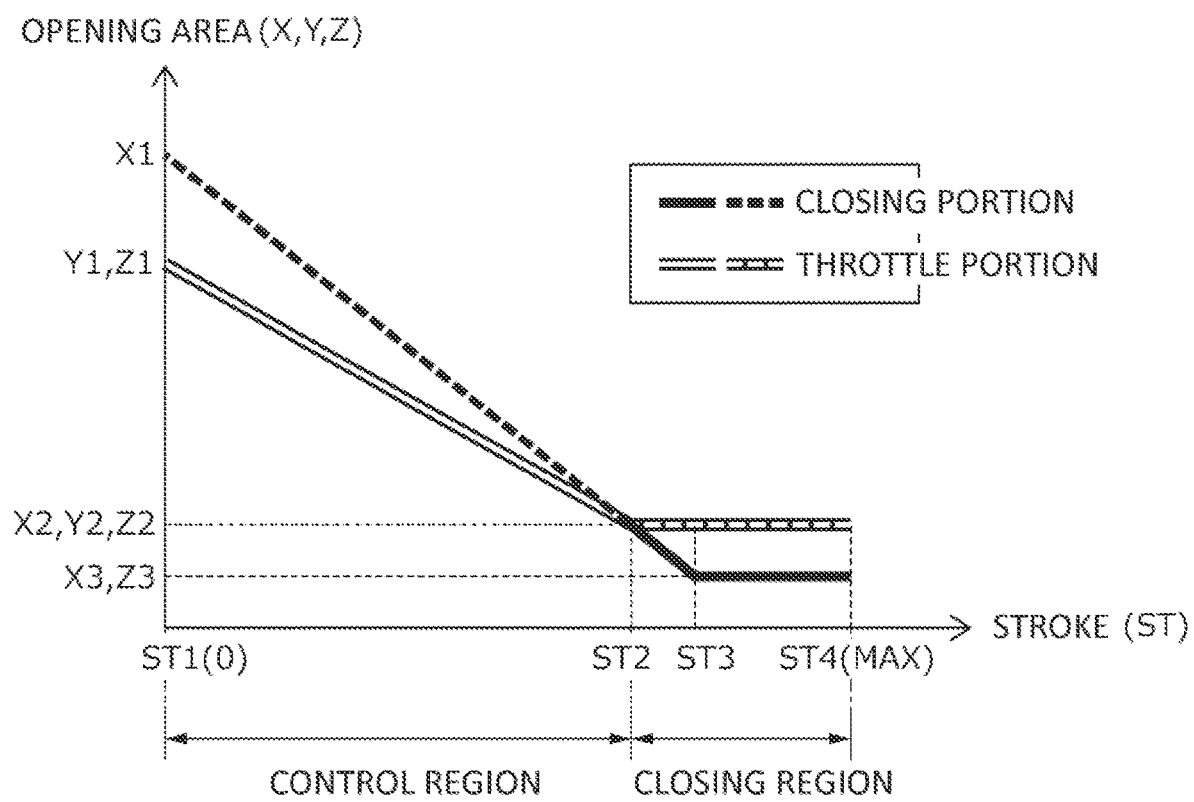
FIG. 13 is a graph for describing a transition of an opening area with the stroke of a valve body in the capacity control valve in the third embodiment.

In addition, when a stroke range of the columnar portion 151d of the CS valve body 151 is a range within the large-diameter flow passage 14, as indicated by a black chain line and a black solid line in FIG. 13, the opening area X of the closing portion 190 gradually becomes narrower as the CS valve body 151 moves in the valve closing direction ($X1 \leq X$ ($ST1 \leq ST < ST3$)$<X3$).

In addition, when a stroke range of the columnar portion 151d of the CS valve body 151 is a range within the small-diameter flow passage 13, the opening area X of the closing portion 190 is constant as indicated by the black solid line in FIG. 13 (X ($ST3 \leq ST \leq ST4$)=X3).

Figure 11:
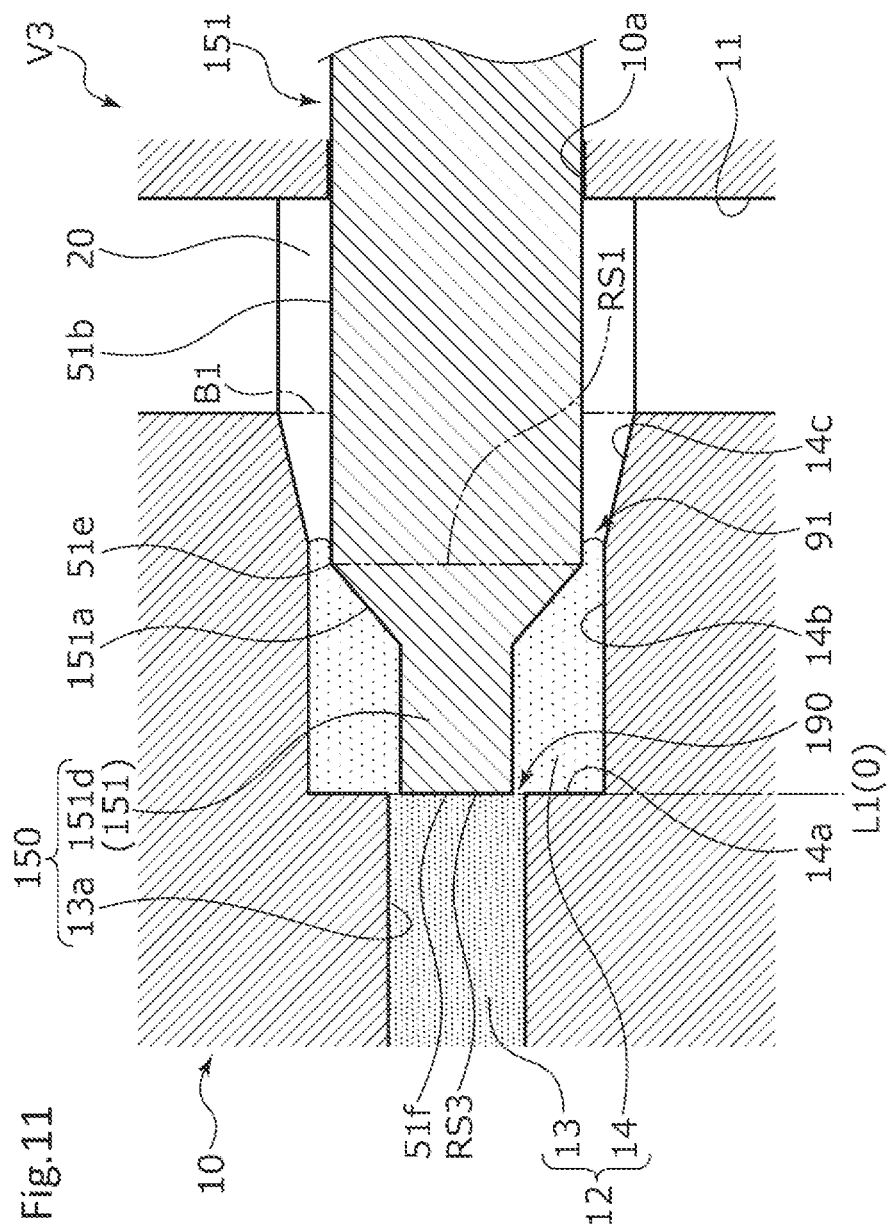
FIG. 11 is an enlarged cross-sectional view showing the valve chamber of the capacity control valve in the third embodiment.
Figure 12:
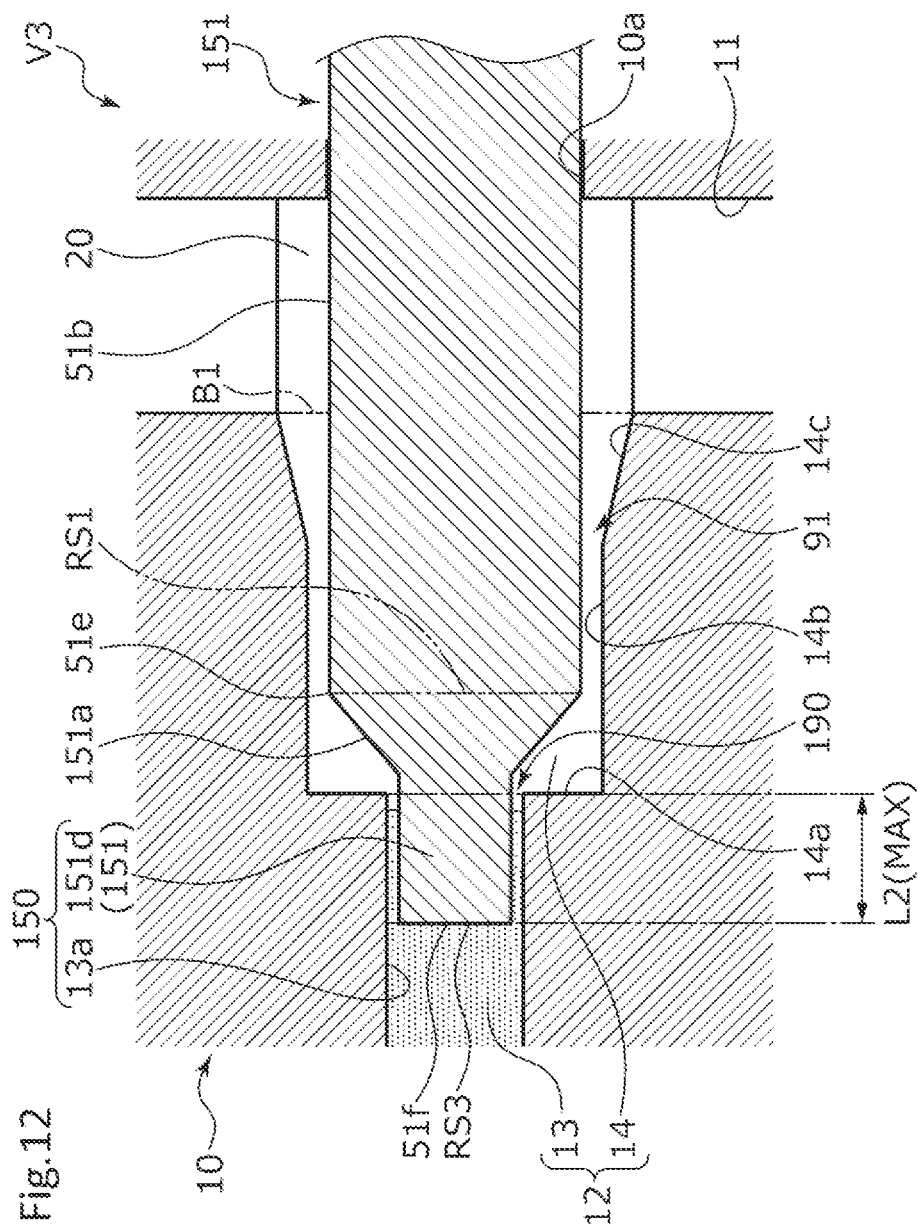
FIG. 12 is an enlarged cross-sectional view showing the valve chamber of the capacity control valve in the third embodiment.

With reference to FIGS. 11 and 12, in a stroke range $ST3 \leq ST \leq ST4$ of the columnar portion 151d of the CS valve body 151, an axial dimension L of a space where the opening area X of the closing portion 190 is X3 that is very narrow increases as the columnar portion 151d approaches ST4 from ST3 ($L1(0) \leq L \leq L2(MAX)$).

In addition, as the columnar portion 151d approaches ST4 from ST3, the space of an opening area X3 of the closing portion 190 becomes longer in the axial direction, and it is difficult for the fluid to pass through the closing portion 190. For this reason, the flow rate is slightly reduced as the columnar portion 151d approaches ST4, and an axial dimension L2 is long at ST4, so that a leakage from the Pc port 13 to the valve chamber 20 is small, and a closed state can be ensured.

With reference to FIG. 13, when the capacity control valve V3 is in a non-energized state and the energization electric current is less than a predetermined value, the stroke ST of the CS valve body 151 is ST1(0) (corresponding to FIG. 9), and when the energization electric current is the predetermined value or more, the stroke ST increases in order of ST2 (corresponding to FIG. 10), ST3 (corresponding to FIG. 11), and ST4 (corresponding to FIG. 12).

With reference to FIG. 13, when the stroke ST of the CS valve body 151 is ST1, the opening area X of the closing portion 190 is X1, and an opening area Y of the throttle portion 91 is Y1. In addition, an opening area Y1 is narrower than an opening area X1 (Y1<X1). At this time, an opening area Z of the CS valve 150 is Z1 that the opening area Y1 of the throttle portion 91.

Then, as indicated by a fine dot pattern in FIG. 9, since both opening areas X1 and Y1 are sufficiently wide, the control fluid of the control pressure Pc flows from the Pc port 13 into a space from the small-diameter flow passage 13 in the through-flow passage 12 to the Ps port 11.

With reference to FIG. 13, when the stroke ST of the CS valve body 151 is ST2, the opening area X of the closing portion 190 is X2, and an opening area Y of the throttle portion 91 is Y2. In addition, opening areas X2 and Y2 are substantially the same (X2=Y2), and a flow rate of the control fluid that can pass through the closing portion 190 and a flow rate of the control fluid that can pass through the throttle portion 91 are substantially the same. Namely, the opening area Z of the CS valve 150 is Z2 that the opening area Y2 of the throttle portion 91.

Figure 10:
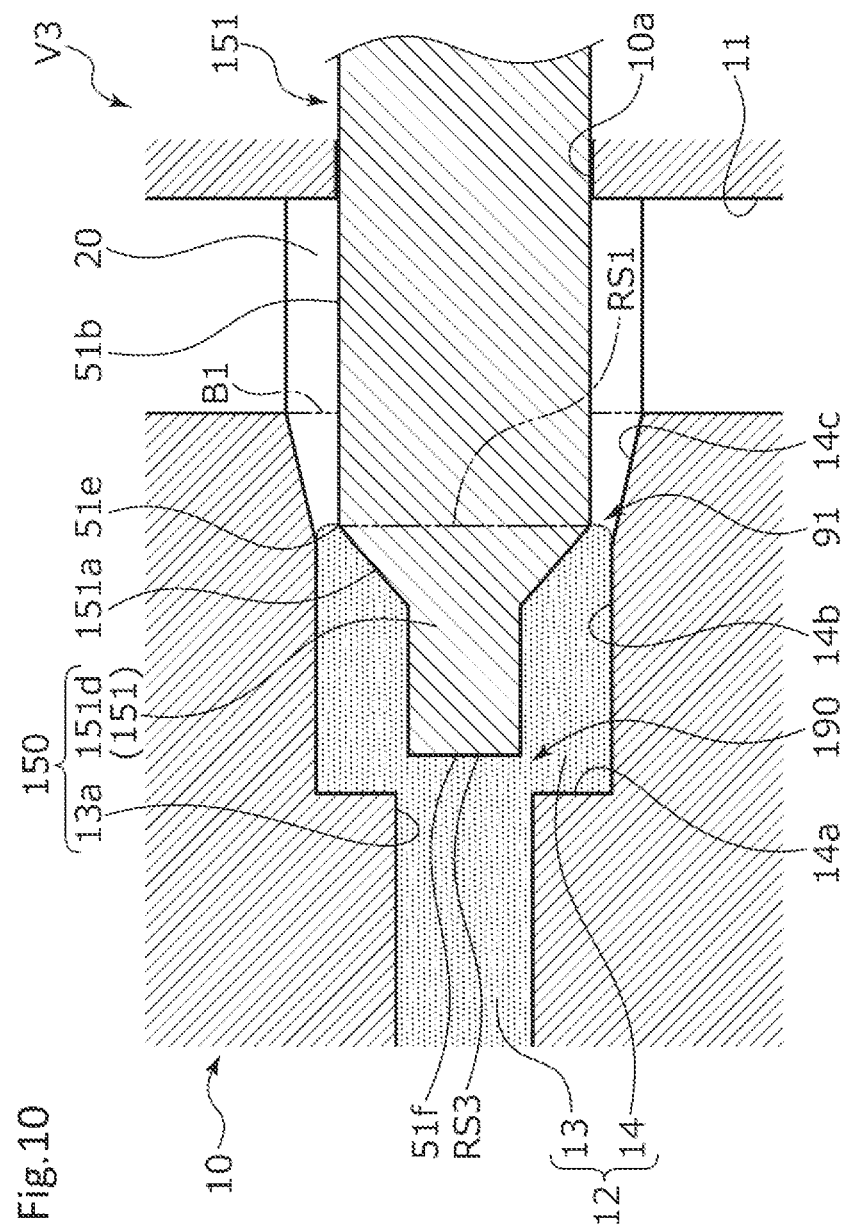
FIG. 10 is an enlarged cross-sectional view showing the valve chamber of the capacity control valve in the third embodiment.

Accordingly, as indicated by a fine dot pattern in FIG. 10, the control fluid of the control pressure Pc flows from the Pc port 13 into a space from the small-diameter flow passage 13 in the through-flow passage 12 to the throttle portion 91.

As indicated by the black chain line and a white solid line in FIG. 13, in the stroke range $ST1 \leq ST \leq ST2$ of the CS valve body 151, as the stroke makes the transition from ST1 to ST2, the opening area of the closing portion 190 and the opening area of the throttle portion 91 gradually decrease, so that the flow rate of the control fluid flowing into the valve chamber 20 from the Pc port 13 can be adjusted. At this time, a small Pc−Ps differential pressure mainly acts on the tapered portion 151a of the columnar portion 151d of the CS valve body 151. Namely, the cross-sectional area RS1 of the large-diameter portion 51b of the CS valve body 151 is an effective pressure-receiving area.

Incidentally, the stroke range $ST1 \leq ST \leq ST2$ of the CS valve body 151 is a control region in the present embodiment (refer to FIG. 13).

With reference to FIG. 13, when the stroke ST of the CS valve body 151 is ST3, the opening area X of the closing portion 190 is X3, and an opening area Y of the throttle portion 91 is Y2. In addition, an opening area X3 is narrower than the opening area Y2 (X3<Y2), and a flow rate of the control fluid that can pass through the closing portion 190 is smaller than a flow rate of the control fluid that can pass through the throttle portion 91.

In addition, the axial dimension L of the space of the opening area X3 of the closing portion 190 is L1 that is 0. Namely, the opening area Z of the CS valve 150 is Z3 that is the opening area X3 of the closing portion 190.

Accordingly, as indicated by a fine dot pattern in FIG. 11, a space from the small-diameter flow passage 13 in the through-flow passage 12 to the closing portion 190 is substantially filled with the control fluid of the control pressure Pc that has flowed in from the Pc port 13. In addition, since the opening area Y of the throttle portion 91 is wider than the opening area X of the closing portion 190 in a space from the closing portion 190 to the throttle portion 91, as indicated by a coarse dot pattern in FIG. 11, a pressure of the fluid in the space that has passed through the closing portion 190 is lower than a pressure of the fluid before passing through the closing portion 190.

As described above, in a stroke range ST2<ST≤ST3, a large Pc−Ps differential pressure acts on the CS valve body 151. Specifically, a high pressure acts on an end surface 51f of the columnar portion 151d, and a small pressure acts on the tapered portion 151a. Namely, the cross-sectional area RS3 of the columnar portion 151d of the CS valve body 151 is an effective pressure-receiving area.

With reference to FIG. 13, when the stroke ST of the CS valve body 151 is ST4, similarly to the stroke ST3, the opening area X of the closing portion 190 is X3, and the opening area Y of the throttle portion 91 is Y2 (X3<Y2).

In addition, the axial dimension L of the space of the opening area X3 of the closing portion 190 is L2 that is its maximum. Namely, the opening area Z of the CS valve 150 is Z3 that is the opening area X3 of the closing portion 190, and the CS valve 150 is in a closed state.

Accordingly, as indicated by a fine dot pattern in FIG. 12, the space from the small-diameter flow passage 13 in the through-flow passage 12 to the closing portion 190 is filled with the control fluid of the control pressure Pc that has flowed in from the Pc port 13. In addition, since the flow rate of the fluid flowing through the closing portion 190 is substantially 0 in the space from the closing portion 190 to the throttle portion 91, the space is filled with the fluid of the suction pressure Ps.

As described above, in the stroke range ST3 ST≤ST4 of the CS valve body 151, a larger Pc−Ps differential pressure acts on the CS valve body 151. Specifically, a high pressure acts on the end surface 51f of the columnar portion 151d. Namely, the cross-sectional area RS3 of the columnar portion 151d of the CS valve body 151 is an effective pressure-receiving area.

Incidentally, a stroke range ST2<ST ST4 of the CS valve body 151 is a closing region in the present embodiment (refer to FIG. 13).

In addition, the configuration is such that with respect to the stroke ST2 as a reference, a magnitude relationship between the opening area X of the closing portion 190 and the opening area Y of the throttle portion 91 is reversed and when the opening area X of the closing portion 190 is narrower than the opening area Y of the throttle portion 91, switching between the control region and the closing region is performed.

As described above, in the capacity control valve V3 of the present embodiment, the closing portion 190 has a spool valve structure, the cross-sectional area RS3 narrower than the cross-sectional area RS1 is an effective pressure-receiving area in the closing region (ST2<ST≤ST4) of the CS valve body 151, and a force that the CS valve body 151 receives from the fluid is reduced. For this reason, the driving force of the solenoid 80 that drives the CS valve body 151 when the valve is closed can be reduced. In addition, since an increase rate of the Pc-Ps differential pressure is small in the control region, the flow rate can be accurately adjusted according to the electric current.

In addition, in the capacity control valve V3 of the present embodiment, since the closing portion 190 has a spool valve structure, the CS valve body 151 does not practically come into contact with the through-flow passage 12, so that a decrease in sealing performance can be suppressed.

Incidentally, in the present embodiment, the closing portion 190 is configured to have a spool valve structure, but the present invention is not limited to the configuration, and the tapered portion 151a has a poppet valve configuration where the tapered portion 151a is seated on the CS valve seat 15, and in such a configuration, the valve can be reliably closed by virtue of a characteristic of the poppet valve structure while making the best use of a characteristic of the spool valve structure.

Fourth Embodiment

A capacity control valve V4 as a valve according to a fourth embodiment of the present invention will be described with reference to FIG. 14. Incidentally, a description of duplicated configurations that are the same as the configurations of the first to third embodiments will be omitted.

As shown in FIG. 14, in the capacity control valve V4 in the fourth embodiment, a columnar portion 251d having a small diameter of a CS valve body 251 is formed at a tip of the large-diameter portion 51b.

In addition, an end surface 251g having an annular shape of the large-diameter portion 51b can be seated on a CS valve seat 115 formed at a radially inner end portion of the bottom portion 14a of the large-diameter flow passage 14. A CS valve 250 of the present embodiment has a poppet valve structure including a nose at a tip. Incidentally, in FIG. 14, when the valve is closed, the CS valve body 251 is shown by an alternate long and two short dashed line.

A closing portion 290 includes the end surface 251g of the large-diameter portion 51b and the CS valve seat 115, and can adjust an opening area p of the closing portion 290 according to the stroke st of the CS valve body 251. The opening area p of the closing portion 290 is a flow passage area between the end surface 251g and the CS valve seat 115.

A throttle portion 291 includes the columnar portion 251d of the CS valve body 251 and the peripheral wall surface 13a of the small-diameter flow passage 13, and can adjust an opening area q of the throttle portion 291 according to the stroke st of the CS valve body 251. The opening area q of the throttle portion 291 is a flow passage area between the columnar portion 251d and the peripheral wall surface 13a.

A gap between the columnar portion 251d and the small-diameter flow passage 13 is wide, and the opening area q is sufficiently wider than the opening area between the columnar portion 151d and the small-diameter flow passage 13 of the third embodiment. Accordingly, in the throttle portion 291, the flow rate of the fluid can be adjusted until the opening area p of the closing portion 290 is narrower than the opening area q of the throttle portion 291.

As described above, a stroke range in which the flow rate of the fluid can be adjusted by the throttle portion 291 is a control region in the present embodiment. In the control region, a small Pc−Ps differential pressure mainly acts on the end surface 251g of the large-diameter portion 51b. Namely, the cross-sectional area RS1 of the large-diameter portion 51b of the CS valve body 251 is an effective pressure-receiving area. In addition, in the control region, the opening area q of the throttle portion 291 is an opening area r of the CS valve 250.

In the closing portion 290, the narrower the opening area p of the closing portion 290 is than the opening area q of the throttle portion 291, the more difficult it is for the fluid to pass from the small-diameter flow passage 13 to the large-diameter flow passage 14. Then, when the end surface 251g of the large-diameter portion 51b is seated on the CS valve seat 115, the valve is closed.

As described above, a stroke range in which the closing portion 290 makes it difficult for the fluid to pass from the small-diameter flow passage 13 to the large-diameter flow passage 14 is a closing region in the present embodiment. In the closing region, a large Pc–Ps differential pressure acts on the CS valve body 251 in substantially the same range as the inner diameter cross-sectional area of the small-diameter flow passage 13. Namely, a cross-sectional area RS4 of the range is an effective pressure-receiving area. In addition, in the closing region, the opening area p of the closing portion 290 is the opening area r of the CS valve 250.

As described above, in the capacity control valve V4 of the present embodiment, the closing portion 290 is configured in the large-diameter flow passage 14, the throttle portion 291 is configured in the small-diameter flow passage 13, a magnitude relationship between the opening area p of the closing portion 290 and the opening area q of the throttle portion 291 is reversed according to the stroke st of the CS valve body 251, and when the opening area p of the closing portion 290 is narrower than the opening area q of the throttle portion 291, switching between the control region and the closing region is performed. In other words, switching between the cross-sectional area RS4 as an effective pressure-receiving area in the closing region and the cross-sectional area RS1 as an effective pressure-receiving area in the control region is performed according to the stroke st of the CS valve body 251. For this reason, the driving force of the solenoid 80 that drives the CS valve body 251 when the valve is closed can be reduced.

In the fourth embodiment, an example has been described in which the throttle portion 291 includes the columnar portion 251d of the CS valve body 251 and the peripheral wall surface 13a of the small-diameter flow passage 13, but the throttle portion may include an outer peripheral surface of the large-diameter portion 51b and an inner peripheral surface of the large-diameter flow passage 14. Incidentally, the same applies to the following modification examples.

As shown in FIG. 15, as a first modification example of the capacity control valve V4, a tapered surface and a protrusion portion 251a are formed between a columnar portion 251d and the large-diameter portion 51b of a CS valve body 351. The tapered surface is gradually increased in diameter from an axially right end of the columnar portion 251d in the radially outward direction and to the left in the axial direction. The protrusion portion 251a includes a radially outer end of the tapered surface and an outer peripheral surface that is continuous with the outer peripheral surface of the large-diameter portion 51b, and is formed in a mortar shape. A CS valve 350 may be configured to have a poppet valve structure in which a corner portion 151e of the protrusion portion 251a is seated on the CS valve seat 115. With such a configuration, the corner portion 151e is seated on the CS valve seat 115, so that the valve can be reliably closed.

As shown in FIG. 16, as a second modification example of the capacity control valve V4, a CS valve 450 may be configured to have a poppet valve structure in which a tapered portion 351a of a CS valve body 451 is seated on a CS valve seat 215 of a valve housing 210.

In addition, a closing portion 390 may include a bottom portion 214a having a tapered shape, at an inner end of which the CS valve seat 215 is formed and which is gradually increased in diameter toward the right in the axial direction, and the tapered portion 351a of the CS valve body 451.

In addition, an axial dimension of a large-diameter flow passage 214 of a through-flow passage 212 can be shortened. For example, a peripheral wall surface 214b can be made shorter than an axial dimension of the peripheral wall surface 114b in the second embodiment. In other words, a communication passage communicating with the outside of the valve housing may be formed in the peripheral wall surface 114b of the second embodiment separately from the Ps port 11 and the Pc port 13.

As shown in FIG. 17, as a third modification example of the capacity control valve V4, a large-diameter flow passage 314 of a through-flow passage 312 of the valve housing 310 may be configured to include only the bottom portion 214a having a tapered shape.

The embodiments of the present invention have been described above with reference to the drawings; however, the specific configurations are not limited to the embodiments, and the present invention also includes changes or additions that are made without departing from the concept of the present invention.

For example, in the embodiments, the closing portion and the throttle portion have been described as being configured to control the flow rate of the fluid of the control pressure Pc, but the present invention is not limited to the configuration, and the closing portion and the throttle portion may be configured to control the flow rate of the fluid of the discharge pressure Pd.

In addition, a configuration where one throttle portion is formed has been described, but the present invention is not limited to the configuration, and for example, a configuration may be adopted in which a medium-diameter flow passage communicating with a small-diameter flow passage and a large-diameter flow passage communicating with the medium-diameter flow passage are provided, a first throttle portion including a peripheral wall surface of the medium-diameter flow passage and a valve body and a second throttle portion including a peripheral wall surface of the large-diameter flow passage and the valve body are provided, and as the stroke increases, fluid control is switched in order of the second throttle portion, the first throttle portion, and a closing portion, namely, a plurality of the throttle portions may be formed in the axial direction of the valve body. With such a configuration, the driving force of the solenoid that drives the valve body when the valve is closed can be reduced by being divided in a plurality of stages.

In addition, a configuration has been described in which the valve seat is formed in the valve housing, but the present invention is limited to the configuration, and a configuration may be adopted in which a valve seat member formed separately from the valve housing is assembled to the valve housing.

In addition, a configuration has been described in which the valve body also serves as a rod that is disposed through the coil of the solenoid, but the present invention is not limited to the configuration, and the valve body and the rod may be separate bodies.

In addition, as the shape of the valve body and the through-flow passage, the poppet valve structure in which the tip of the valve body is sharp has been described in the first and second embodiments, and the spool valve structure in which the tip of the valve body has a columnar shape has been described in the third embodiment. But a structure as in the fourth embodiment may be adopted as long as the effective pressure-receiving area where the pressure of the fluid acts on the valve body according to the stroke of the valve body is narrower in the closing region than in the control region, and the shapes of the valve body and the through-flow passage can be appropriately changed.

REFERENCE SIGNS LIST

10 Valve housing
12 Through-flow passage

13 Pc port, small-diameter flow passage (closing portion side of through-flow passage)
14 Large-diameter flow passage (throttle portion side of through-flow passage)
15 CS valve seat
50 CS valve
51 CS valve body
51b Large-diameter portion (base portion)
51d Contact portion (tip portion)
80 Solenoid (drive source)
90 Closing portion
91 Throttle portion
110, 210, 310 Valve housing
112, 212, 312 Through-flow passage
114, 214, 314 Large-diameter flow passage
115, 215 CS valve seat
150, 250, 350, 450 CS valve
151, 251, 351, 451 CS valve body
151d Columnar portion (tip portion)
190, 290, 390 Closing portion
191, 291 Throttle portion
RS1 Cross-sectional area (cross-sectional area of base portion, control regional effective pressure-receiving area)
RS2 Cross-sectional area (cross-sectional area of tip portion, closing regional effective pressure-receiving area)
RS3 Cross-sectional area (cross-sectional area of tip portion, closing regional effective pressure-receiving area)
RS4 Cross-sectional area (closing regional effective pressure-receiving area)
st, ST Stroke of CS valve body
V1 to V4 Capacity control valve (valve)
p, x, X Opening area of closing portion
q, y, Y Opening area of throttle portion
r, z, Z Opening area of CS valve

The invention claimed is:

1. A flow rate control valve, comprising:
a valve housing; and
a valve body to be driven by a drive source,
wherein the flow rate control valve is configured to control a flow rate of a fluid flowing through a through-flow passage in a direction opposite a closing direction of the valve body, by moving the valve body from a control region to a closing region,
the valve housing has a large diameter hole and a small diameter hole which communicates with the large diameter hole in an axial direction,
the through-flow passage is defined by the valve body, the large diameter hole and the small diameter hole,
a valve seat is provided at a border between the large diameter hole and the small diameter hole,
the valve body includes a contact portion which is brought into contact with and separated from the valve seat, and a corner portion which is provided at an edge of an outer peripheral surface of the valve body,
the contact portion of the valve body and the valve seat cooperatively form a closing portion,
an inner peripheral surface of the large diameter hole and the corner portion of the valve body cooperatively from a throttle portion,
the closing region is a stroke range of the valve body in which an opening area of the throttle portion is larger than an opening area of the closing portion,
the control region is a stroke range of the valve body in which the opening area of the throttle portion is smaller than the opening area of the closing portion,
the valve body has an effective pressure-receiving area where a pressure of the fluid acts on the valve body, the effective pressure-receiving area being switched, in accordance with a movement of the valve body in the axial direction, between a control regional effective pressure-receiving area that exists when the valve body is positioned in the control region and a closing regional effective pressure-receiving area that exists when the valve body is positioned in the closing region, and
the closing regional effective pressure-receiving area is smaller than the control regional effective pressure-receiving area.

2. The flow rate control valve according to claim 1, wherein an opening area of the throttle portion is constant when the valve body is positioned in the closing region.

3. The flow rate control valve according to claim 1, wherein the closing portion has a poppet valve structure.

4. The flow rate control valve according to claim 1, wherein the closing portion has a spool valve structure.

5. The flow rate control valve according to claim 1, wherein the through-flow passage has a stepped shape such that the through-flow passage has an opening which is larger on a side of the throttle portion than a side of the closing portion side.

6. The flow rate control valve according to claim 1, wherein the through-flow passage is partially defined by a tapered surface formed in the throttle portion.

7. The flow rate control valve according to claim 2, wherein the closing portion has a poppet valve structure.

8. The flow rate control valve according to claim 2, wherein the closing portion has a spool valve structure.

9. The flow rate control valve according to claim 2, wherein the through-flow passage has a stepped shape such that the through-flow passage has an opening which is larger on a side of the throttle portion than a side of the closing portion side.

10. The flow rate control valve according to claim 2, wherein the through-flow passage is partially defined by a tapered surface formed in the throttle portion.

11. The flow rate control valve according to claim 3, wherein the through-flow passage has a stepped shape such that the through-flow passage has an opening which is larger on a side of the throttle portion than a side of the closing portion side.

12. The flow rate control valve according to claim 3, wherein the through-flow passage is partially defined by a tapered surface formed in the throttle portion.

13. The flow rate control valve according to claim 4, wherein the through-flow passage has a stepped shape such that the through-flow passage has an opening which is larger on a side of the throttle portion than a side of the closing portion side.

14. The flow rate control valve according to claim 4, wherein the through-flow passage is partially defined by a tapered surface formed in the throttle portion.

15. The flow rate control valve according to claim 5, wherein the through-flow passage is partially defined by a tapered surface formed in the throttle portion.

* * * * *